US012754330B2

(12) United States Patent
Lebel et al.

(10) Patent No.: US 12,754,330 B2
(45) Date of Patent: Oct. 6, 2026

(54) PORTABLE SYSTEM COMPRISING A PRIMARY GAS FLOWPATH, A CARTRIDGE DOCK INCLUDING A FILTER CARTRIDGE, AND A GAMMA DETECTOR APPARATUS FOR MONITORING AIRBORNE RADIONUCLIDES

(71) Applicant: ATOMIC ENERGY OF CANADA LIMITED/ ÉNERGIE ATOMIQUE DU CANADA LIMITÉE, Chalk River (CA)

(72) Inventors: Luke Lebel, Chalk River (CA); Anthony Clouthier, Chalk River (CA); Raymond Dickson, Chalk River (CA)

(73) Assignee: ATOMIC ENERGY OF CANADA LIMITED/ ENERGIE ATOMIQUE DU CANADA LIMITÉE, Chalk River (CA)

( * ) Notice: Subject to any disclaimer, the term of this patent is extended or adjusted under 35 U.S.C. 154(b) by 87 days.

(21) Appl. No.: 18/580,180

(22) PCT Filed: Jul. 20, 2022

(86) PCT No.: PCT/CA2022/051120
§ 371 (c)(1),
(2) Date: Jan. 18, 2024

(87) PCT Pub. No.: WO2023/000093
PCT Pub. Date: Jan. 26, 2023

(65) Prior Publication Data
US 2024/0345271 A1 Oct. 17, 2024

Related U.S. Application Data

(60) Provisional application No. 63/223,903, filed on Jul. 20, 2021.

(51) Int. Cl.
*G01T 1/16* (2006.01)
*G01T 1/167* (2006.01)
(Continued)

(52) U.S. Cl.
CPC .............. *G01T 1/178* (2013.01); *G01T 1/167* (2013.01); *G01T 1/366* (2013.01); *G01T 7/04* (2013.01); *G01V 5/26* (2024.01)

(58) Field of Classification Search
CPC .. G01T 1/16; G01T 1/167; G01T 1/17; G01T 1/178; G01T 1/18; G01T 1/185;
(Continued)

(56) References Cited

U.S. PATENT DOCUMENTS

| | | | | |
|---|---|---|---|---|
| 4,920,263 | A | 4/1990 | Fimian et al. | |
| 5,952,655 | A * | 9/1999 | Gross | G01T 1/178 250/304 |

(Continued)

FOREIGN PATENT DOCUMENTS

| | | | |
|---|---|---|---|
| CA | 2341870 | A1 | 3/2000 |
| JP | S5839586 | U | 3/1983 |

(Continued)

OTHER PUBLICATIONS

Evans, W. C, et al., "Quantitative methods for continuous particulate air monitoring", EEE Transactions on Nuclear Science, 48(5), 2001, 1639-1657.

(Continued)

*Primary Examiner* — Allen C. Ho
(74) *Attorney, Agent, or Firm* — Joseph C. Zucchero; Carolyn S. Elmore; Elmore Patent Law Group, P.C.

(57) ABSTRACT

A portable system for measuring airborne radionuclides from a target environment can include a primary gas flow-path including a cartridge dock. At least a first filter cartridge may be connectable to the cartridge dock and may include
(Continued)

a cartridge gas inlet sealingly connectable to the sample supply port, a cartridge gas outlet sealingly connectable to the exhaust port; and a cartridge flowpath extending therebetween. The cartridge can include first and second filter chambers housing first and second filters. A gamma detector apparatus may be positionable adjacent the first filter cartridge when the first filter cartridge is connected to the cartridge dock and is configured to detect radiation emitted from the first filter and to detect radiation emitted from the second filter, and to generate a sensor output signal in based on the detected radiation.

20 Claims, 21 Drawing Sheets

(51) Int. Cl.

| | |
|---|---|
| ***G01T 1/178*** | (2006.01) |
| ***G01T 1/24*** | (2006.01) |
| ***G01T 1/36*** | (2006.01) |
| ***G01T 7/04*** | (2006.01) |
| ***G01V 5/26*** | (2024.01) |

(58) Field of Classification Search

CPC .. G01T 1/24; G01T 1/248; G01T 1/29; G01T 1/2914; G01T 1/2928; G01T 1/2935; G01T 1/36; G01T 1/365; G01T 1/366; G01V 5/26; G01V 5/281

USPC ........................... 250/370.09; 378/98.8, 98.9

See application file for complete search history.

(56) References Cited

U.S. PATENT DOCUMENTS

| | | | | |
|---|---|---|---|---|
| 6,184,531 | B1 * | 2/2001 | Smart | G01T 1/178 250/370.01 |
| 7,824,479 | B2 | 11/2010 | Rowley et al. | |
| 9,012,843 | B2 * | 4/2015 | Joung | G01T 1/36 250/336.1 |
| 9,689,995 | B2 * | 6/2017 | Taleyarkhan | G01T 1/178 |
| 10,031,060 | B2 * | 7/2018 | Mauro | G01T 1/178 |
| 10,031,090 | B2 * | 7/2018 | Briden | G01T 1/36 |
| 10,379,234 | B2 * | 8/2019 | Wei | G01T 1/167 |
| 10,585,197 | B2 | 3/2020 | Briden et al. | |
| 10,906,020 | B2 * | 2/2021 | Eshima | A61K 51/0491 |
| 11,940,576 | B1 * | 3/2024 | Allendorf | G01T 1/167 |
| 2016/0370302 | A1 | 12/2016 | Briden et al. | |
| 2018/0246232 | A1 | 8/2018 | Cong et al. | |
| 2018/0340896 | A1 | 11/2018 | Briden et al. | |

FOREIGN PATENT DOCUMENTS

| | | | |
|---|---|---|---|
| JP | H01-019183 | U | 1/1989 |
| JP | H03502368 | A | 5/1991 |
| JP | 2006329784 | A | 12/2006 |
| JP | 2015227842 | A | 12/2015 |
| KR | 20190119272 | A | 10/2019 |
| KR | 102042277 | B1 | 11/2019 |

OTHER PUBLICATIONS

Lebel, L. S, et al., “Radioiodine in the atmosphere after the Fukushima Dai-ichi nuclear accident”, J Environl Radioact., 151(1), 2016, 82-93.

Schwantes, J. M, et al., “Analysis of a nuclear accident: fission and activation product releases from the Fukushima Daiichi nuclear facility as remote indicators of source identification, extent of release, and state of damaged spent nuclear fuel”, Environ Sci & Technol, 46(16), 2012, 8621-8627.

Casanovas, et al. Development and calibration of a real-time airborne radioactivity monitor using gamma-ray spectrometry on a particulate filter. IEEE Transactions on Nuclear Science. Feb. 21, 2014;61(2):727-31.

Extended European Search Report for EP22844776, dated Mar. 19, 2025.

* cited by examiner

PORTABLE SYSTEM COMPRISING A PRIMARY GAS FLOWPATH, A CARTRIDGE DOCK INCLUDING A FILTER CARTRIDGE, AND A GAMMA DETECTOR APPARATUS FOR MONITORING AIRBORNE RADIONUCLIDES

CROSS-REFERENCE TO RELATED APPLICATION

This application claims the benefit of, and priority to, U.S. provisional application No. 63/223,903 filed Jul. 20, 2021 and entitled Portable System for Monitoring Airborne Radionuclides, the entirety of which being incorporated herein by reference.

FIELD

The present subject matter of the teachings described herein relates generally to a portable radiation detection apparatus, and in particular a portable system for monitoring airborne radionuclides.

BACKGROUND

U.S. Pat. No. 10,585,197 discloses a portable detection apparatus includes a fluid inlet to acquire a stream of fluid, a fluid outlet and a fluid flow path therebetween. A pump circulates the fluid through the fluid flow path. A gamma spectrometer and a mercury analyzer engage the fluid flow path to analyze and detect radiation emitted by the fluid. A filter trap is in the fluid flow path downstream from the gamma spectrometer and the mercury analyzer. The filter trap includes a valve assembly and at least a first and second filter for collecting gaseous constituents from the fluid. Each filter is removably connected to the first valve assembly. The valve assembly has a first configuration, in which the first filter is fluidly connected to the fluid flow path and the second filter is fluidly isolated from the fluid flow path, and a second configuration, in which the second filter is fluidly connected to the fluid flow path and the first filter is fluidly isolated from the fluid flow path.

U.S. Pat. No. 7,824,479 discloses an apparatus for sampling air in an aircraft cabin comprises: a sensor for detecting air contaminants, a processor, a data logger means for detecting when the apparatus is airborne, a control unit, a manual trigger at least one adsorbent tube, valves or other means for isolating the adsorbent tube from contamination and a pump for drawing air through the adsorbent tube. An alternative apparatus uses a Tedlar® bag. Methods of sampling air and uses of the apparatus are also disclosed.

Canadian Patent Publication no. 2,341,870 discloses systems for perimeter air quality monitoring that can establish background levels of target contaminants in ambient air prior to initiation of remedial activities. The systems can develop remedial action levels that are protective of the public health for dust and vapors at the remediation property and can monitor and document fence line ambient air levels of target contaminants during remedial activities. Accordingly, the systems and process allow for evaluation of the need for dust or vapor control measures to reduce airborne containment levels to below levels of concern.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

Environmental monitoring systems and apparatus can be used in a variety of situations to measure levels and emission levels of potential contaminants. To properly assess the environmental situation, detect emissions and profile the flow of emissions, it may be necessary to measure and analyze acquired fluid samples using a series or sequence of different techniques and analytical equipment. In some cases, analysis and monitoring equipment may be used at a site only once, for instance to investigate contamination or emissions from a recent unplanned emission such as caused by an accident, disaster or emergency.

For example, radiation monitoring stations around nuclear reactors can provide useful information in the case of a nuclear emergency. They can help to confirm the fact that radioactivity is being released into the environment and may help quantify the dose rates that people in the vicinity might be exposed to. Two types of radiation monitoring stations are used at present. The first, which make up the majority of monitoring stations, measure the ambient radiation dose rate. These can provide real-time data on dose rates. These are not, however, able to provide any specific information on the individual species of radionuclides that are present in the air. This is often addressed by employing air samplers. Here, airborne radionuclides are captured onto filters, which can then be analyzed later, via gamma spectrometry, to provide the missing information on the composition of the radionuclide mix.

A nuclear event where there is an undesired/uncontrolled release of radioactive material into the environment can release a variety of different materials, and in different concentrations. Obtaining generally reliable and timely information about the nature and amounts of the radioactive material can be helpful in coordinating a response. For example, a severe accident at a nuclear power plant can potentially emit dozens of different radionuclide species. One such event was the Fukushima Daiichi accident that occurred in March 2011. In this event, some important/notable releases from the Fukushima accident were the radioisotopes of Xe, I, Te, Cs, Tc, La, Sb, Ba, Ag, for example. Each radionuclide emits gamma radiation at different energies, and because of that they all contribute to the overall ambient gamma dose rate to a different extent. Using the techniques described above, it is not possible discriminate between different radioisotopes from an ambient gamma radiation measurement. It is very challenging even to make inferences about the radioactivity concentrations in the vicinity of the measurement without a priori assumptions about the radionuclide mix. Limited on-site, real-time monitoring and measuring systems contributed this lack of available information. For example, on-site air sampling measurements that were conducted during the Fukushima Daiichi accident that occurred in March 2011 were limited in duration and in location because field teams had to be sent out to run the sampling systems and retrieve the filters for gamma spectrometry analysis in a separate laboratory. The start of air sampling was delayed, and it was impossible for emergency responders to use the information about the airborne radionuclide composition in a timely way.

It may be beneficial in such circumstances to have a portable detection apparatus capable of performing one or more different measurements and analysis, and preferably to be able to allow measurements to be taken in the field and optionally in real-time or at least near real-time rather than requiring that samples be obtained from the field and transported to a lab or other off-site facility for analysis. For example, having real-time or near real-time data of radionuclide emissions, on an isotope-by-isotope basis, would be useful, owing at least in part to the large differences in radiotoxicity of different radioisotopes. Radioiodine, for example, may be particularly important when considering exposure by humans because of its affinity to accumulate in the thyroid. The isotope $^{132}$Te is important as well because it decays into $^{132}$I, which has a similar radiotoxicity to other radioiodine species. Radioiodine can also exist in several chemical forms in the environment, including aerosol, $I_2$ vapour, and volatile organic iodine. Radiocesium, on the other hand, may be less important in first responder situations due to its relatively lower immediate radiotoxicity in the early phases of the accident, but may have longer-term implications owing to its two long-lived radioisotopes, $^{134}$Cs and $^{137}$Cs.

To help address at least some of the shortcomings in the existing radiation monitoring systems, the teachings herein are related to a system that can be used to measure airborne radioactivity concentrations in situ, or on site, in the environment during a severe accident, preferably including events that may be expected to be of the same order of magnitude as what was in the environment during the 2011 Fukushima accident. Preferably, the systems described herein may be configurable to provide live, near real-time information about the concentrations of different radionuclides in the air, without having to rely on human intervention to change filters, collect samples, or perform the laboratory gamma spectrometry measurements. The system may optionally utilize a suitable sensor apparatus, such as a spectrometer that can be combined with a novel filter cartridge apparatus that can be capture and sequester airborne radionuclides and provide a sufficient view factor for the sensor apparatus to obtain useful readings. That is, the systems and methods described herein can preferably be configured to measure the concentrations of different radionuclides in the air around a given target location (such as the location of a suspected nuclear event), without having to rely on human intervention.

The systems described herein may include a main system housing or frame that can contain the various systems components, and may include a gamma sensor apparatus that is operable to detect one or more target radioactive materials in real-time, a filter cartridge that can include one or more filters for capturing airborne radionuclides (which may include particles and/or vapour species) and that can be physically positioned relative to the gamma sensor apparatus to permit useful radiation measurements using the gamma sensor apparatus, as well as a suitable power supply (optionally onboard batteries and/or a connection to an external power source), a controller or other suitable apparatus for coordinating the operation of the gamma sensor apparatus and any other hardware (such as a transmitter and/or receiver) for communicating the sensor measurements to a remote user for monitoring/analysis. The system may also include other components as desired, including those as described herein.

One example of a suitable sensor apparatus can include Cd—Zn—Te (CZT) spectrometers (for example as described in S. Mukhopadhyay, R. Maurer, P. Guss, "Modern trends in gamma detection systems for emergency response," Proc. SPIE 11494, Hard X-Ray, Gamma-Ray, and Neutron Detector Physics XXII, 114940B (2020); doi: 10.1117/12.2560115, which is incorporated herein by reference), which may provide reasonably high resolution spectra with a room temperature sensor, and help facilitate the conducting of measurements in the field. Examples of suitable filter cartridges are described herein and can preferably be configured to include separate aerosol and iodine filters that are in a common filter unit and having an internal air flow passage that can help direct air flow between the two filters. The filter cartridge is also preferably configured to provide sufficient view factors between the filters and CZT sensors and the positioning of the sensors relatively close to the filters to help improve the measurement accuracy.

Optionally, an automation system can be used to remove used/saturated cartridges from the sampling region and preferably provide fresh cartridges from a cartridge bank or other suitable source. This may allow the system to continue operating for a longer period of time, and specifically to have an operating period that is longer than the operating life/capacity of any one given sampling cartridge.

Preferably, to help facilitate the exchange of multiple filter cartridges the system can be configured to include coupling mechanisms that allow a filter to be inserted into the system (and into the desired airflow communication) with a generally one-direction, or linear insertion movement, rather than requiring a more complicated range of motion or orientation of the cartridge. This may help simplify the requirements of an automate filter replacement system. Preferably, the desired air flow connections can also be established generally automatically when the cartridge is literally inserted into a corresponding housing or other portion of the overall system, such that a separate step of engaging a coupling or otherwise establishing the air flow path connections is not required. For example, the fittings on the cartridge and the corresponding fitting on the system housing may include a spherical joint, an interference or friction fit or other type of complimentary sealing features that can automatically establish the desired air flow connection when the filter cartridge is physically aligned with the system housing. This may help simplify the cartridge installation process (i.e., avoiding a separate air flow path coupling/connection step), and/or may help reduce the complexity of the automatic cartridge replacement process. This may also have facilitated the relatively easier removal of a used cartridge from the system as the cartridge may simply be grasped and then translated in a generally linear motion away from the system housing, which can simultaneously interrupt the air flow communication between the spent cartridge and the system and remove the cartridge from the housing (e.g., without the need for an initial de-coupling step prior to the physical removal step). Alternatively, in some embodiments of the system the air flow path coupling/decoupling operation may be a separate step(s) in addition to the linear insertion and/or removal of the cartridge. Similarly, in some examples of the system the cartridge may be inserted using at least two degrees of freedom (instead of a simple, substantially linear translation) and the coupling mechanisms can be configured for such purposes.

In one example of the teachings described herein, a system can include Cd—Zn—Te spectrometers, which may provide reasonably high-resolution spectrometry with a room temperature sensor and allow the measurements to be conducted in the field. One example of an improved filter cartridge is configured to hold a pair of aerosol and iodine filters in place within a common cartridge, while keeping the gamma spectrometers as close as possible in order to obtain high count rate efficiencies. A single cartridge may preferably hold both filters and may have an internal flow channel to help direct the air flow between them. The cartridge design also facilitates replacing the filters as the accumulated radioactivity on the filters becomes too high. For example, an automation system can move a filter cartridge from the fresh cartridge storage bank to the sampling location (filtration and gamma spectrometry) and return the used filter cartridge to the used cartridge storage bank. Because the gamma spectrometry measurements are done in-situ with relatively good resolution, and the system may be automated, it may allow data to be transmitted back to a remote user, such as an emergency operations centre or the like immediately (or at least in near real-time), rather than having to wait for the physical recovery and transport of the used filter cartridges and the additional laboratory analysis time.

A portable detection apparatus could provide relatively rapidly deployable monitoring and analysis capabilities to respond to emergencies. It may also be helpful for the detection apparatus to be modular in nature, to allow for modifications depending on the particular environmental assessments required.

In accordance with one broad aspect of the teachings disclosed herein, a portable system for measuring airborne radionuclides from a target environment can be positionable in the target environment and may include a primary gas flowpath extending between a system gas inlet configured to draw in a gas sample and a system gas outlet downstream from the system gas inlet. A cartridge dock may be disposed in the primary gas flowpath and may include a sample supply port in fluid communication downstream from the system gas inlet and an exhaust port in fluid communication upstream from the system gas outlet. At least a first filter cartridge may be connectable to the cartridge dock. The first filter cartridge may include a cartridge gas inlet can be sealingly connectable to the sample supply port; a cartridge gas outlet sealingly connectable to the exhaust port; and a cartridge flowpath extending between the cartridge gas inlet and the cartridge gas outlet. Connecting the first filter cartridge to the cartridge dock may provide the fluid communication between the sample supply port and the exhaust port and completes the primary gas flowpath. A first filter chamber may be disposed in the cartridge flowpath downstream from the cartridge gas inlet and may house a first filter. A second filter chamber may be disposed in the cartridge flowpath between first filter chamber and the cartridge gas outlet and may house a second filter.

A gamma detector apparatus may be positionable adjacent the first filter cartridge when the first filter cartridge is connected to the cartridge dock and is configured to detect radiation emitted from the first filter and to detect radiation emitted from the second filter, and to generate a sensor output signal in based on the detected radiation.

A system controller may be configured to receive the sensor output signal and generate a corresponding user output.

The first filter cartridge may be removable from the cartridge dock. Removing the first filter cartridge from the cartridge dock may interrupt the primary gas flowpath.

The first filter may be of a first filter type and the second filter may be of a different, second filter type.

The first filter may include an aerosol filter configured to capture particulates in the gas sample and the second filter may include an iodine filter.

The filter cartridge may be connectable to the cartridge dock by translating the first filter cartridge in an insertion direction.

When the first filter cartridge is connected to the cartridge the cartridge gas inlet may be registered with the outlet port and a fluid seal is created between the first cartridge and the cartridge dock.

The first filter chamber may be sealed when the first cartridge is connected to the cartridge dock and is opened by removing the first filter cartridge from the cartridge dock.

The first filter may be exposed when the first filter cartridge is removed from the cartridge dock.

The first filter may be removable from the first filter chamber in the insertion direction when the first filter cartridge is removed from the cartridge dock.

The second filter chamber may be sealed when the first cartridge is connected to the cartridge dock and may be opened by removing the second filter cartridge from the cartridge dock.

The second filter may be exposed when the first filter cartridge is removed from the cartridge dock.

The second filter may be removable from the second filter chamber in the insertion direction when the first filter cartridge is removed from the cartridge dock.

The system may include a cartridge handling apparatus that is controllable by the system controller and is configured to remove the first filter cartridge from the cartridge dock at the end of a first cartridge use period.

The system may include a second filter cartridge connectable to the cartridge dock, the second filter cartridge may include: a cartridge gas inlet sealingly connectable to the sample supply port; a cartridge gas outlet sealingly connectable to the exhaust port; and a cartridge flowpath extending between the cartridge gas inlet and the cartridge gas outlet, whereby connecting the first filter cartridge to the cartridge dock provides the fluid communication between the sample supply port and the exhaust port and completes the primary gas flowpath. A first filter chamber disposed in the cartridge flowpath downstream from the cartridge gas inlet and housing a first filter. A second filter chamber may be disposed in the cartridge flowpath between first filter chamber and the cartridge gas outlet and may house a second filter. The cartridge handling apparatus may be controllable by the system controller to connect the second filter cartridge to the cartridge dock after the first filter cartridge is removed from the cartridge dock.

The system may include at least one fresh cartridge bank configured to store unused filter cartridges and containing at least the second filter cartridge. The cartridge handling apparatus may be configured to retrieve the second filter cartridge and move it into registration with the cartridge dock after the first filter cartridge is removed from the cartridge dock.

The system may include at least one used cartridge bank that may be configured to receive, and store used filter cartridges. The cartridge handling apparatus is configured to remove the first filter cartridge from the cartridge dock and deposit it in the used cartridge bank.

The cartridge handling apparatus may include an end effector that is configured to selectably grip the first filter cartridge and that is movable in at least two degrees of freedom.

The cartridge handling apparatus comprises a carriage that is movable along a carriage rail, and an extension unit that is mounted to the carriage and is configured to support and move the end effector along an extension axis.

The carriage rail may be substantially linear.

The extension axis may be substantially linear and may be substantially orthogonal to the carriage rail.

The gamma detector apparatus may include a sensor portion that is movable between:

a measurement position in which it is adjacent the first filter cartridge whereby removal of the first filter cartridge from the cartridge dock is inhibited by the sensor portion; and an exchange position, in which the sensor portion is spaced apart from the first filter cartridge whereby the first filter cartridge can be removed from the cartridge dock.

The gamma detector apparatus may include a detector actuator that is communicably linked to the controller and may support the sensor portion. The detector actuator may be configured to selectably move the sensor portion between the measurement position and the exchange position.

The detector actuator comprises a linear actuator that is configured to linearly translate the sensor portion between the measurement position and the exchange position along a detector axis.

The detector actuator may be operable independently of the cartridge handling apparatus.

The gamma detector apparatus may include at least a first detector that is aligned with the first filter, and a second detector that is spaced apart from the first detector and aligned with the second filter. The first detector may be configured to generate a first detection signal that is based on the gamma radiation in the first filter, and the second detector may be configured to generate a second detection signal that is based on the gamma radiation in the second filter.

At least one of the first and second detectors may include a gamma spectrometer, and preferably a CZT gamma spectrometer, that is at least partially laterally surrounded by a radiation shield to limit exposure to background radiation not emitted from the filter cartridge.

The sample supply port may include a sample dock coupler having a curved supply sealing surface and wherein the cartridge gas inlet comprises a complimentary curved inlet sealing surface configured to seal against the supply sealing surface.

The supply sealing surface may be convex and the curved inlet sealing surface may be concave.

The supply sealing surface may be pressed against the inlet sealing surface to seal the first filter chamber when the first cartridge is connected to the cartridge dock. The first cartridge may be translatable away from the cartridge dock thereby separating the supply sealing surface and the inlet sealing surface without releasing a fastener.

The exhaust port may include an exhaust dock coupler having a curved exhaust sealing surface. The cartridge gas outlet may include a complimentary curved outlet sealing surface configured to seal against the exhaust sealing surface.

The exhaust sealing surface may be convex and the curved outlet sealing surface may be concave.

The exhaust sealing surface may be pressed against the outlet sealing surface to seal the second filter chamber when the first cartridge is connected to the cartridge dock. The first cartridge may be translatable away from the cartridge dock thereby separating the exhaust sealing surface and the outlet sealing surface without releasing a fastener.

Other aspects and features of the teachings disclosed herein will become apparent to those ordinarily skilled in the art, upon review of the following description of the specific examples of the present disclosure.

DRAWINGS

The drawings included herewith are for illustrating various examples of articles, methods, and apparatuses of the teaching of the present specification and are not intended to limit the scope of what is taught in any way.

Figure 13A:
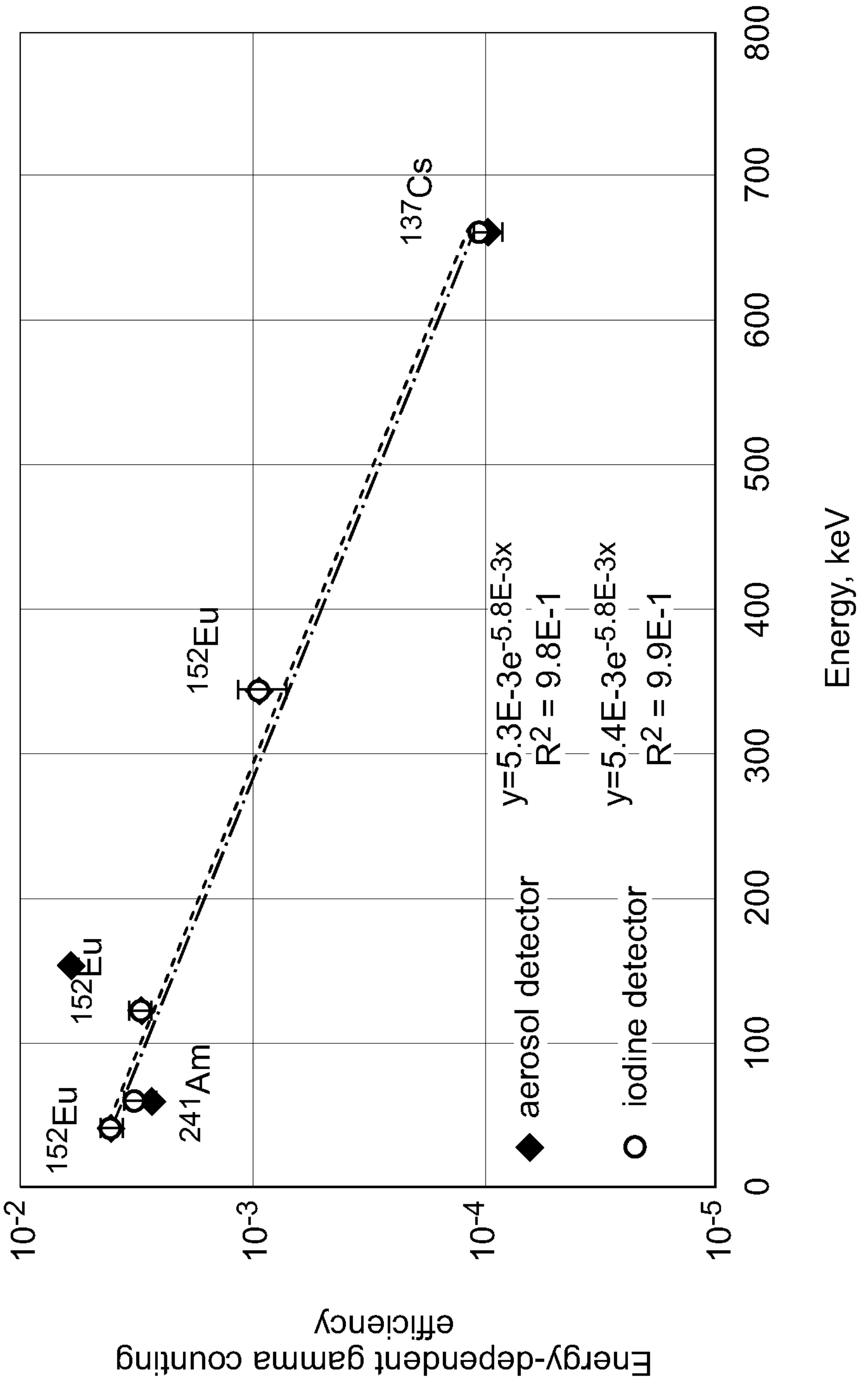
Figure 13B:
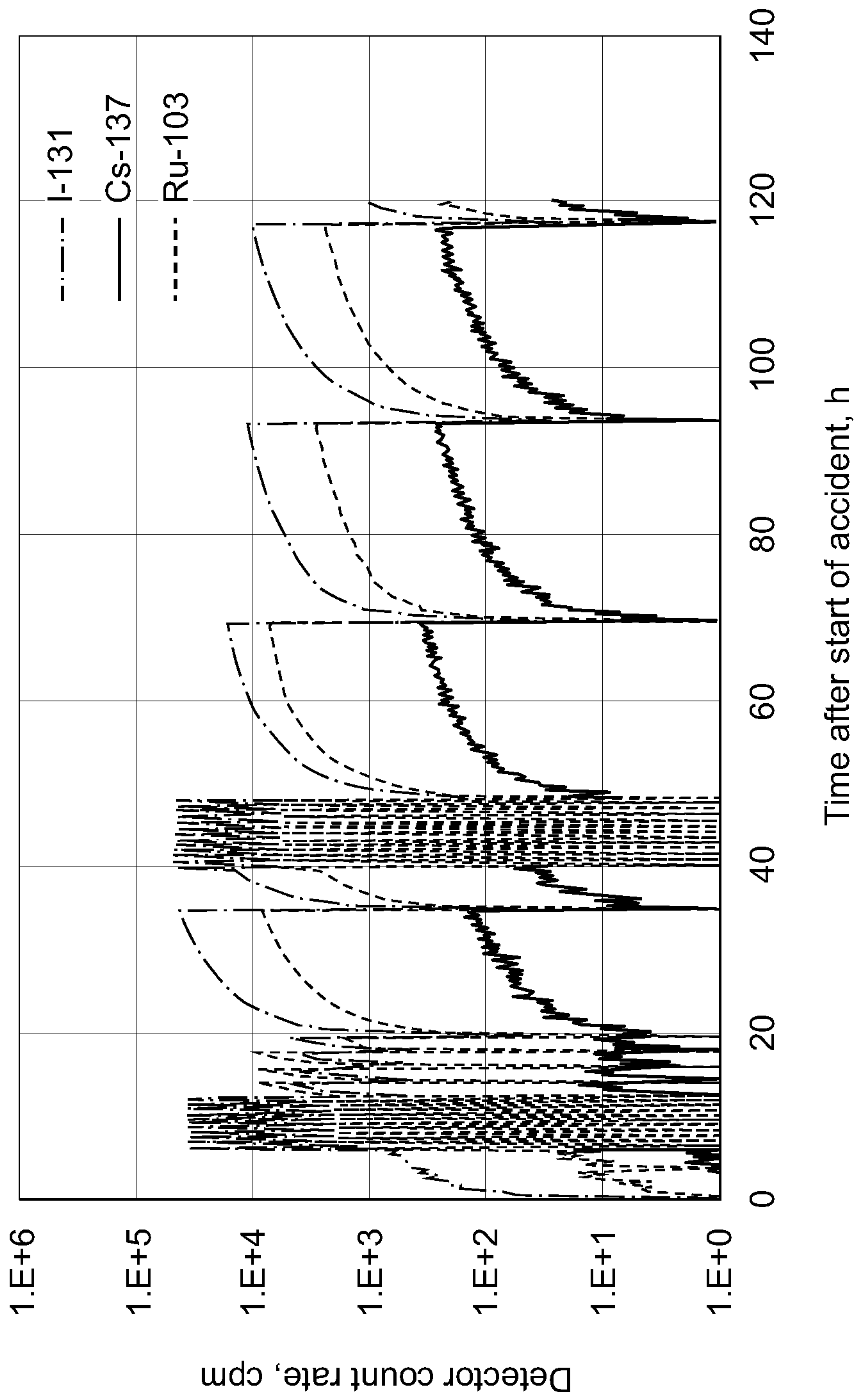
Figure 14:
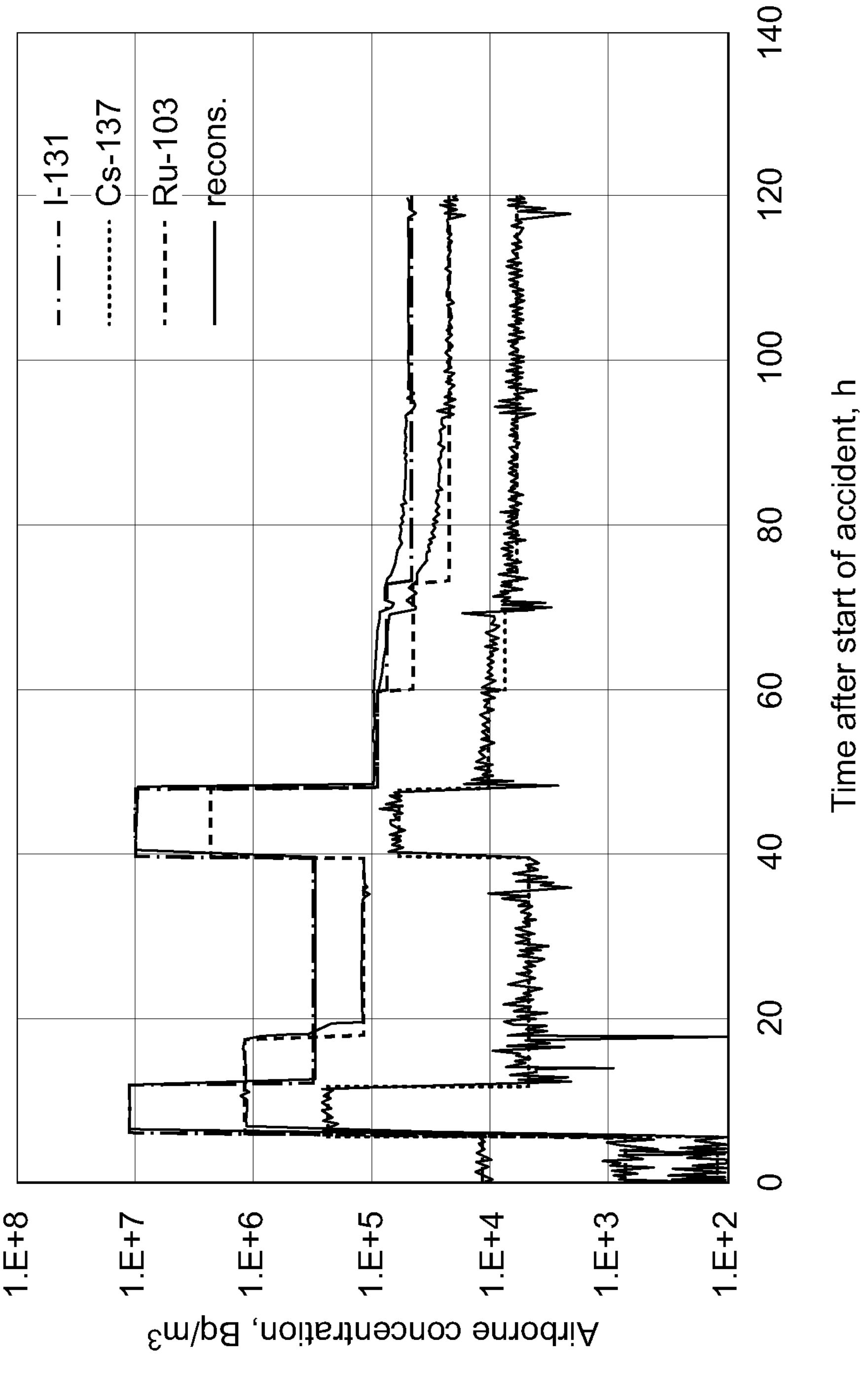
Figure 15:
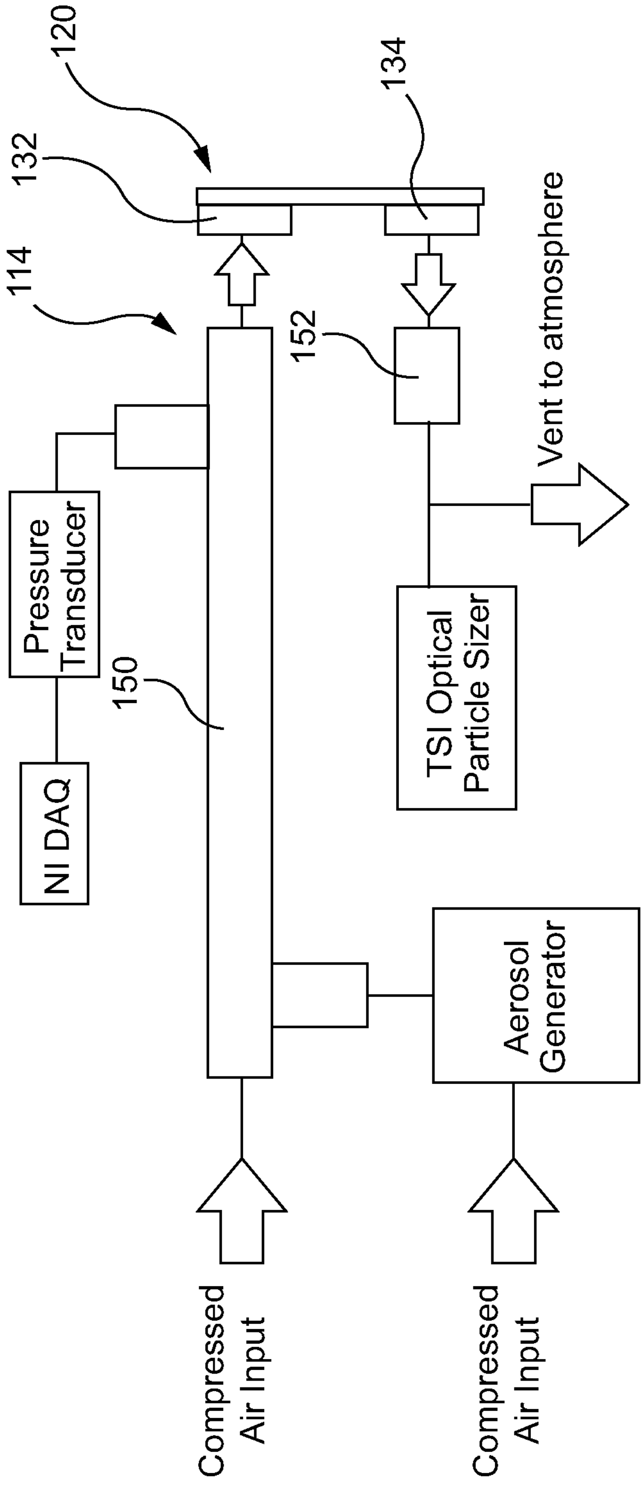
Figure 16:
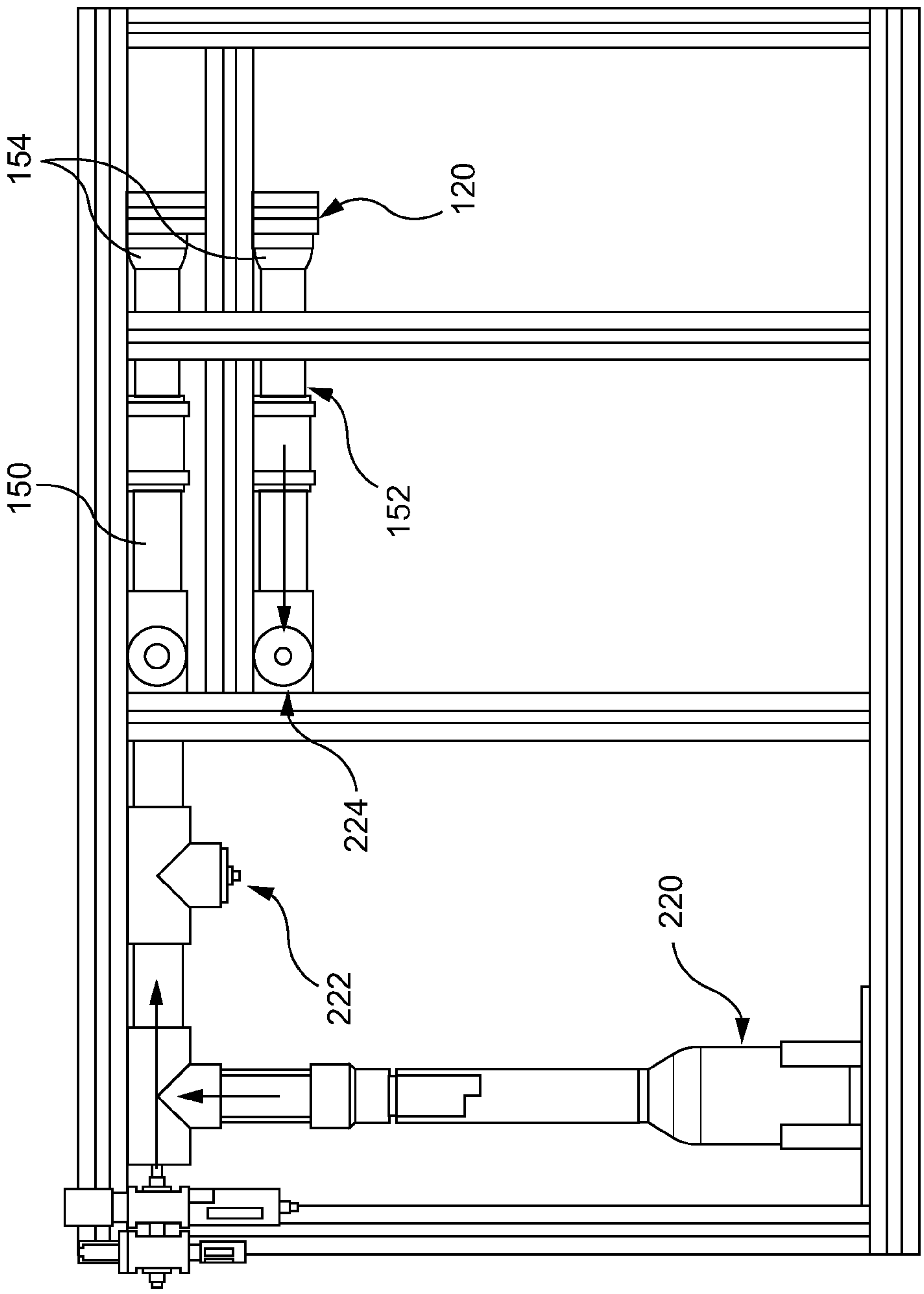
Figure 17B:
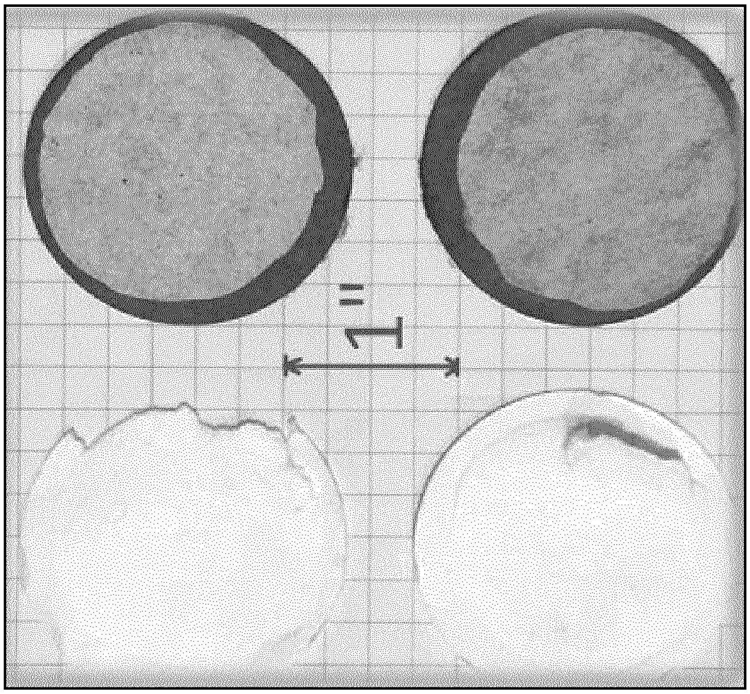
Figure 17A:
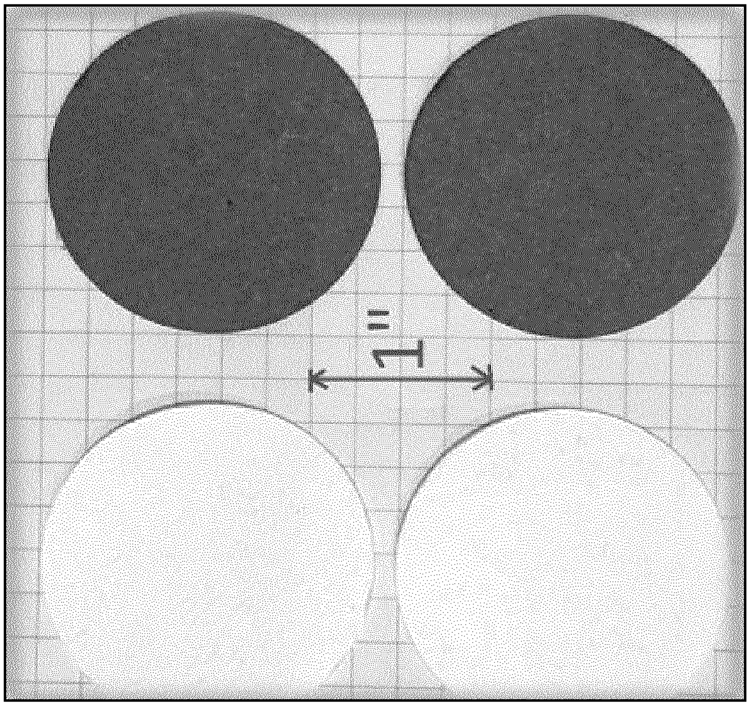
Figure 18:
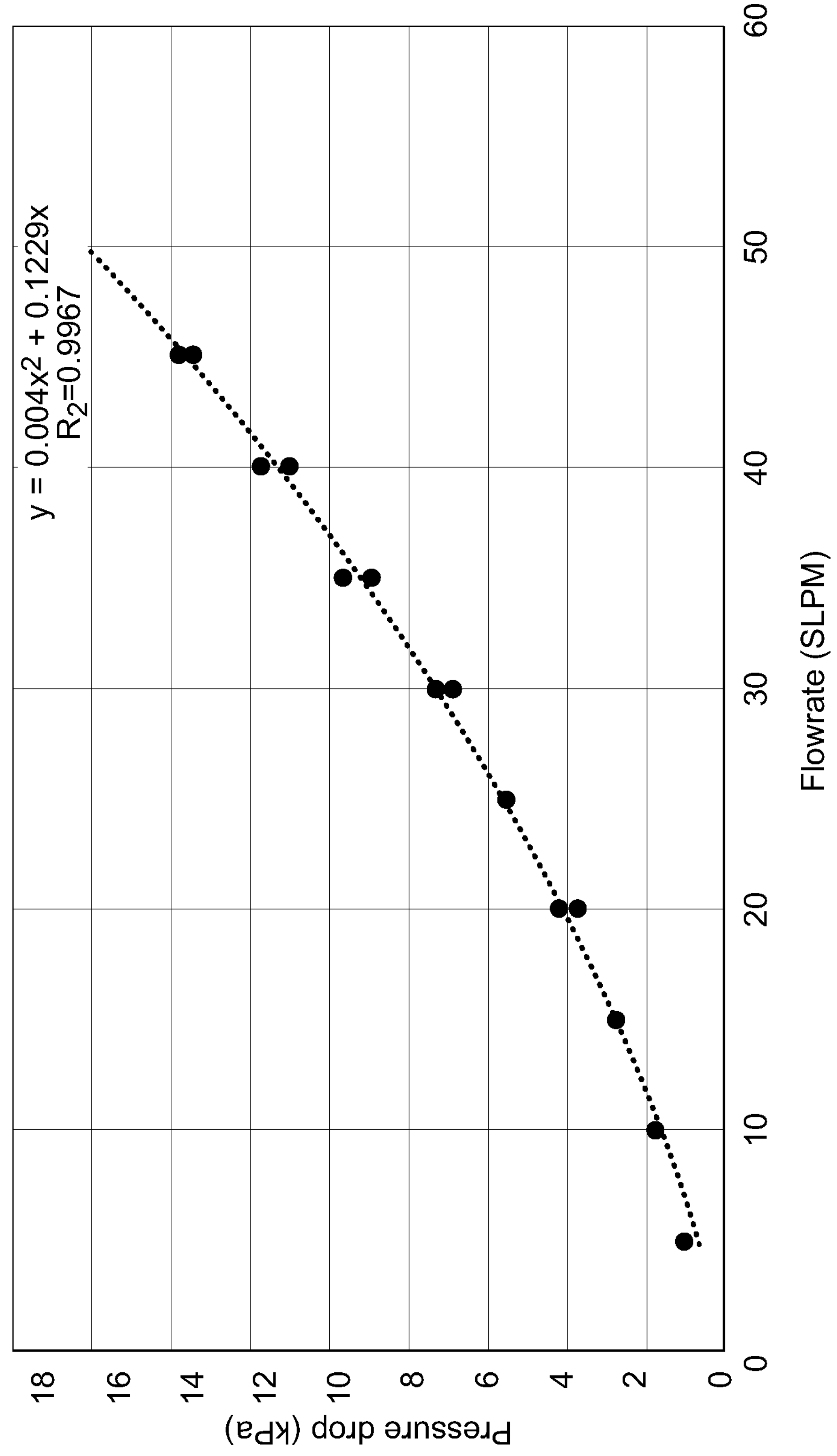
Figure 19:
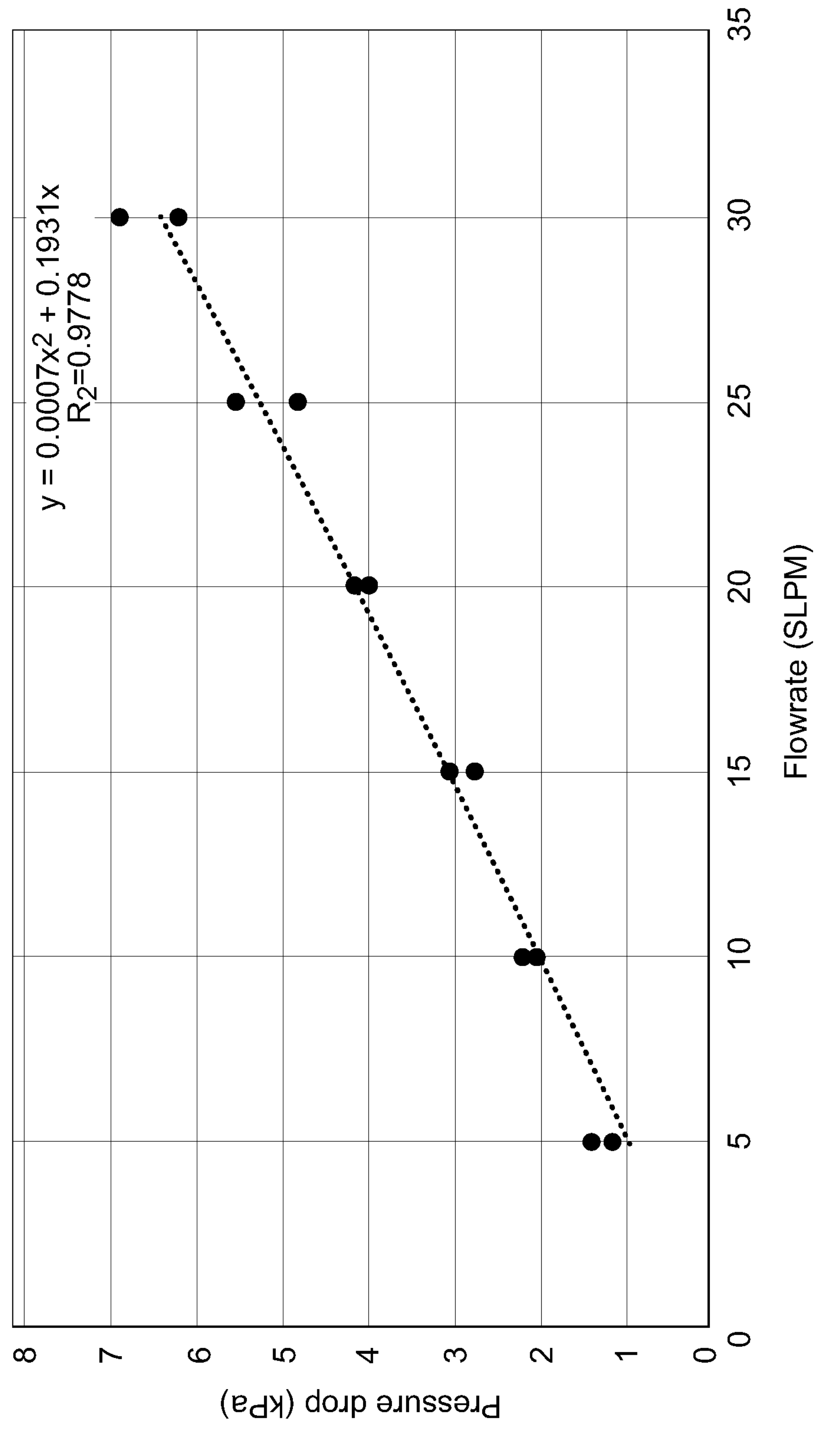
Figure 20:
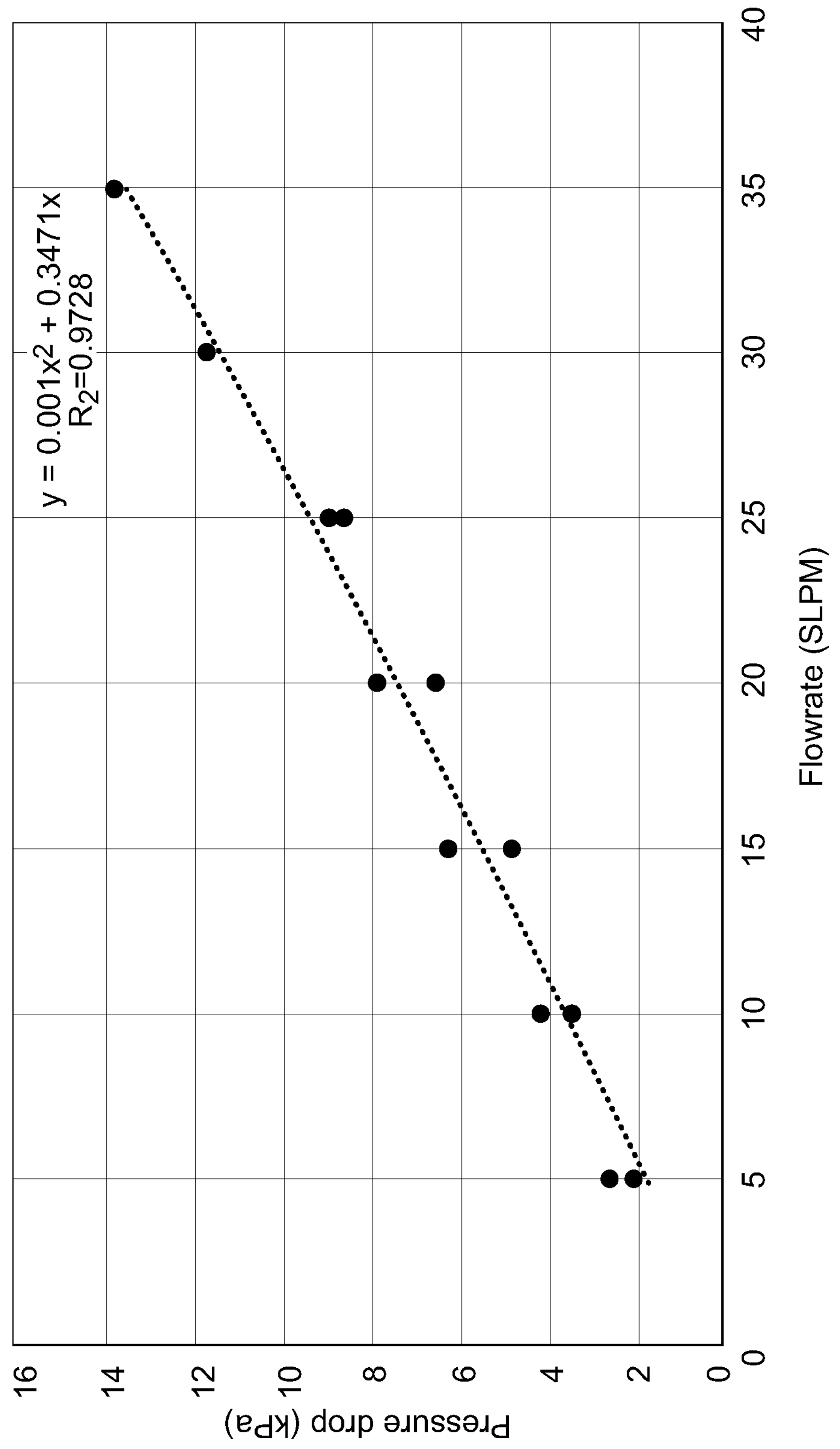
Figure 21:
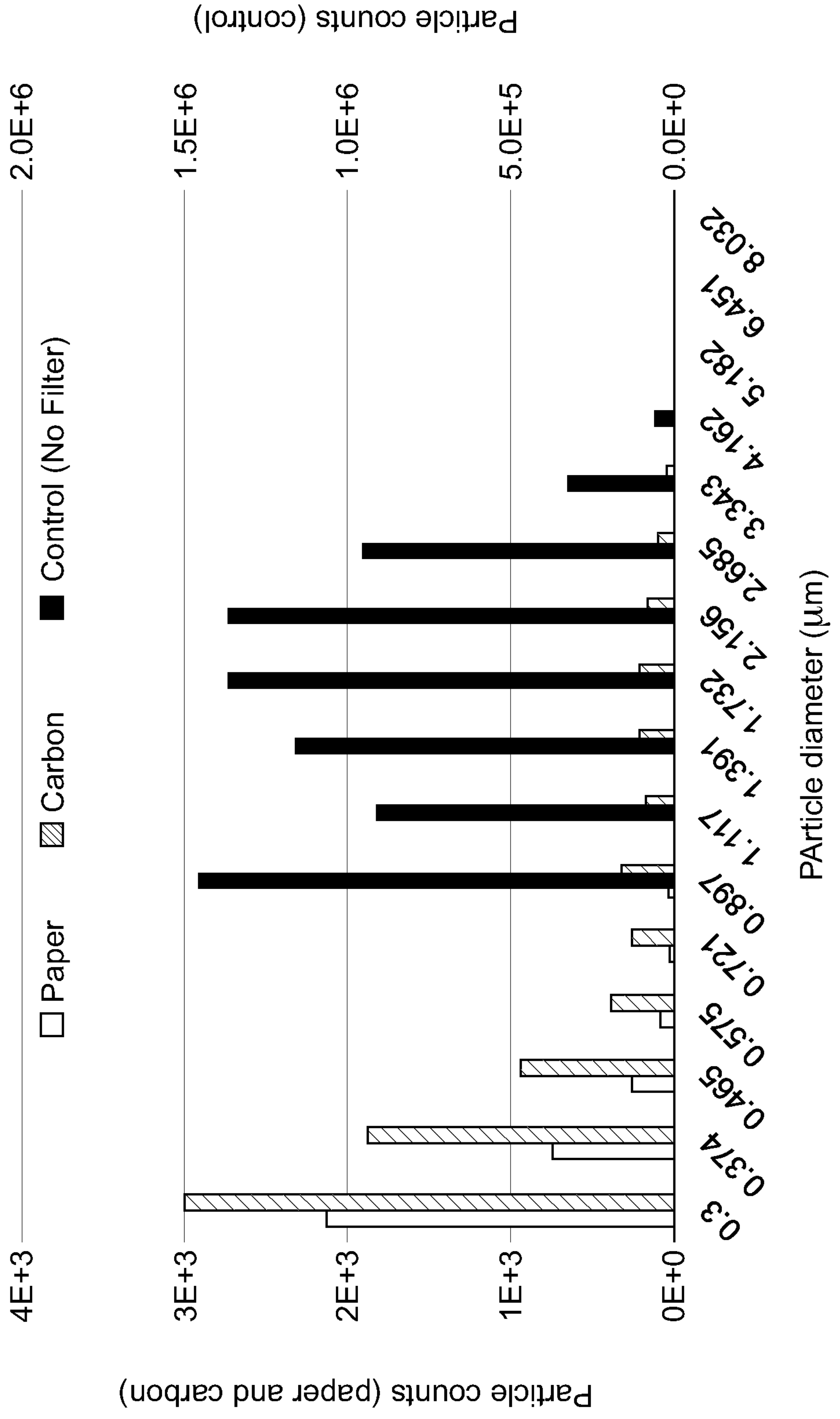

FIG. 13*a* is a graph showing in-situ gamma counting efficiency of the aerosol-filter detector and iodine-filter detector evaluated with the $^{152}$Eu and $^{137}$Cs/$^{241}$Am;

FIG. 13*b* is a graph showing simulated detector count rates of $^{131}$I, $^{137}$Cs, and $^{103}$Ru during a hypothetical nuclear emergency, when the air sampler was following the sampling time-based algorithm for changing filters given in Equation 7;

FIG. 14 is a graph showing reconstructions of airborne concentrations of $^{131}$I, $^{137}$Cs, and $^{103}$Ru during the hypothetical nuclear emergency;

FIG. 15 is a schematic representation of a test apparatus for evaluating the particle retention efficiency;

FIG. 16 is a CAD representation of the test apparatus of FIG. 15;

FIGS. 17*a* and 17*b* are photos of filters used in testing;

FIG. 18 is a graph showing pressure drop vs. flowrate with paper filter only;

FIG. 19 is a graph showing Pressure drop vs. flowrate with activated carbon filter only;

FIG. 20 is a graph showing Pressure drop vs. flowrate with paper and activated carbon filter combined; and FIG. 21 is a histogram of aerosol particle size of transmitted through the filters vs the control (with no filters in place) during testing.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Emergency response situations involving unplanned releases of radiological material may require monitoring or analysis. Such situations include road accidents involving radiological cargo and unplanned discharges to liquid or air. Environmental remediation and decommissioning are another example of a situation where environmental monitoring systems may be employed. Analysis of environmental materials may involve a relatively long turnaround time (sometimes up to weeks of turnaround time) to account for the collection and shipping of the physical filters and samples to an off-site laboratory, the conducting of the testing itself and then time to transmit and receive the results. On-site analysis and monitoring of contaminants in air, dose and contaminant dispersion may all be helpful in the aftermath of an unplanned release of radiological material.

As described herein, portable systems for conducting real-time or near real-time have been developed that utilize in-situ gamma spectrometers. Gamma spectrometers that are suitable for use with the systems described herein are preferably configured so that they can measure large releases from early in the accident, as well as the persistent background from smaller leakages, and as such preferably are able to measure a wide range of potential activity concentrations, $c_{a,i}$, likely on the order of $10^2$ Bq/m$^3$ to $10^8$ Bq/m$^3$. Gamma spectrometers may have a fairly wide dynamic measurement range before becoming saturated, but the measurement range may be further increased, for example by sampling the air for shorter or longer durations of time.

The gamma spectrometers can be configured to measure a physical count rate of a species, $\dot{C}_i$, which is related to the activity of that species on the filter, $A_{f,i}$, by the gamma energy-dependent detection efficiency, $\in_i$:

$$\dot{C}_i = \epsilon_i A_{f,i} \qquad 1$$

The activity on the filter then relates to how much is being captured by the volumetric flow rate of air, F, the filter efficiency, $\phi_f$, and the amount of time that the filter has been used, $t_f$. In addition, the activity of the filter is also subject to radioactive decay, based on the decay constantly. As such, the count rate relates to the air concentration, $c_{a,i}$, by:

$$\dot{C}_i = \epsilon_i F \phi_f c_{a,i} \frac{1 - \exp(-\lambda_i t_f)}{\lambda_i} \qquad 2$$

Equation 2 assumes that the airborne activity concentration and air sample flow rate are both constant. In order to measure the count rate, the gamma spectrometer can acquire data over a specified period of time (a detection periods), $\Delta t_{aq}$, in order to acquire an integrated count above background level, $\Delta C_i$. This detection period is preferably sufficiently long so as to provide a relatively useful/acceptable signal to noise ratio in order to identify the peaks but is preferably sufficiently short in comparison with the increase in activity capture on the filter to approximate the transient count rate.

$$\dot{C}_i \approx \frac{\Delta C_i}{\Delta t_{aq}} \qquad 3$$

An algorithm, such as an algorithm presented in W. C. Evans, "Quantitative methods for continuous particulate air monitoring", IEEE Transactions on Nuclear Science, Vol. 48 (5), pp. 1639-1657 (2001), can be used to calculate the air concentration, including the effects of radioactive decay, and is given by:

$$c_{a,i} = \frac{1}{\epsilon_i F \phi_f \Delta t}\left[\dot{C}_i(\Delta t) - \dot{C}_i(0) + \lambda \int_0^{\Delta t} \dot{C}_i(\tau) d\tau\right] \qquad 4$$

Some assumptions can be made about the system for design and review purposes, for example, the filter efficiencies, $\phi_f$, can be assumed to be near one. The activity of short-lived radioisotopes on the filters will eventually plateau and possibly decrease over time, but at least some of the radioisotopes of interest herein ($^{131}$I, $^{137}$Cs, $^{132}$Te, $^{103}$Ru) either have half-lives that are greater than about 6 hours or are in equilibrium with longer-lived isotopes. This allowed Equation 2 to be reduced as follows for the purposes of the teachings herein, implying that the count rate will go up generally linearly the longer the filter is in place:

$$\dot{C}_i = \epsilon_i F c_{a,i} t_f \qquad 5$$

Figure 1:
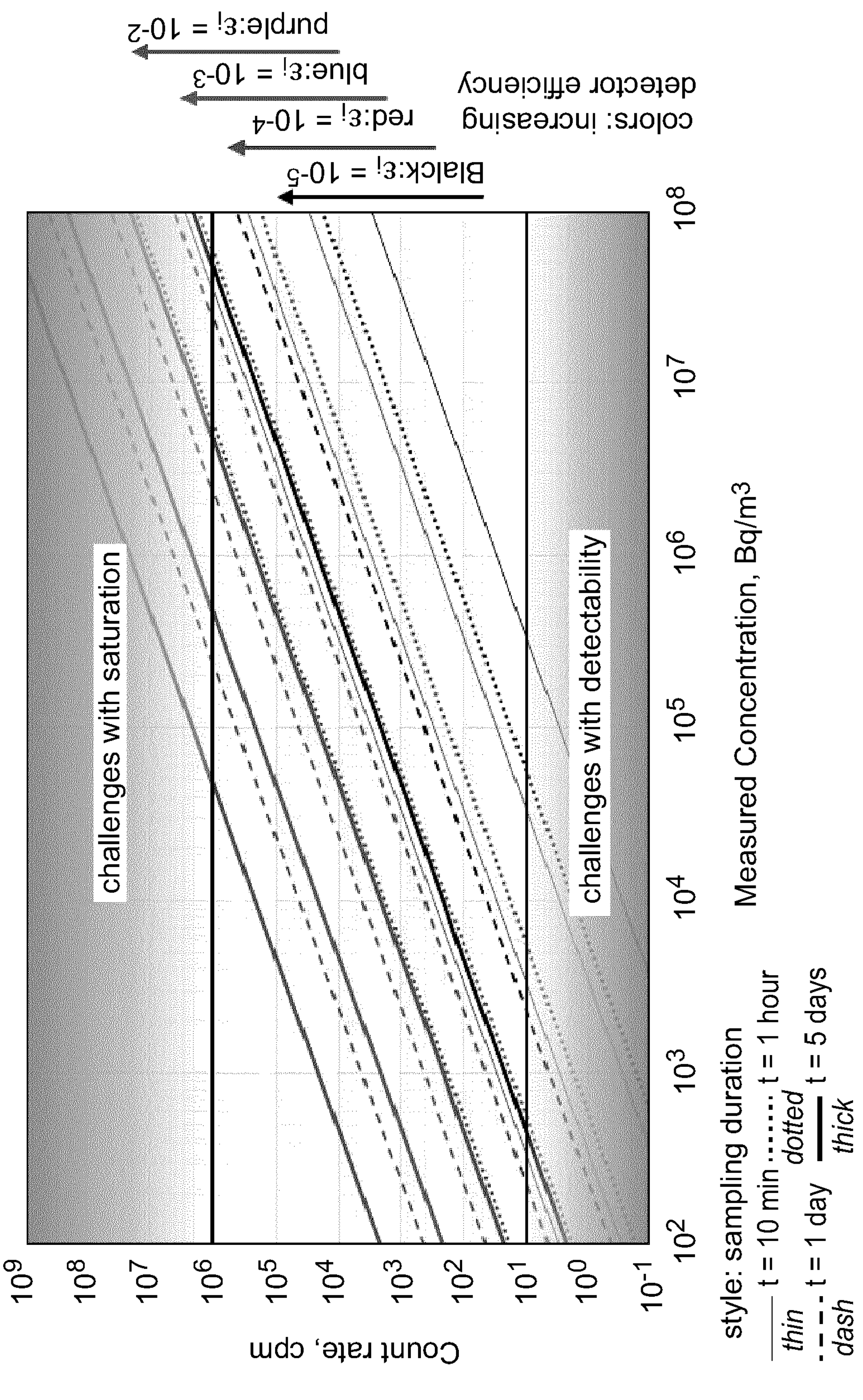
FIG. 1 is a graph illustrating operating envelope options relating the predicted count rate on a filter for a given airborne radionuclide concentration, for different sampling durations (line style) and energy-dependent detector efficiencies (line color)

A number of curves were calculated using Equation 5 and are shown in FIG. 1, given a sampling flow rate of 5 L/min. The relationship between the airborne radioactivity concentration and expected count rate on the filter are shown for a number of combinations of filter collection time and detector efficiency (e.g., for different gamma energies). This plot also shows some of the constraints associated with detecting radioactivity on a filter. If the count rate for a particular radioisotope is less than ~10 counts per minute (cpm), it is relatively unlikely that it could be observed unless very long acquisition times are used, especially if there is relatively a high background due to other radioisotopes captured on the filter. If the overall count rate is above ~$10^6$ cpm, then it appears likely that the detectors described herein would start to saturate and may not be able to work in the desired manner.

As shown in exemplary FIG. 1, air concentrations between $10^2$ Bq/m$^3$ and $10^8$ Bq/m$^3$ can be measured, but not necessarily with a set sampling time period. With a conventional, fixed filter arrangement, one may only expect the filter to be changed once every ~24 hours at most during an emergency, and up to every 5-7 days during routine monitoring. If one of the fixed durations in FIG. 1 is used, the measurable concentration range is decreased by nearly three orders of magnitude in this example. However, the inventors have determined that if the filter cartridge can be changed dynamically in the field, preferably without the need for human intervention, they can be changed much more frequently, and therefore the system as a whole may be capable of obtaining useful measurements for a wider range of airborne concentrations.

Another system design consideration is the reduction in the sensitivity of the detector over time due to accumulated radioactivity within a given filter. For, example, the releases from a nuclear power plant during an accident, or other similar event, may tend to come in bursts, meaning that a cloud containing a relatively high concentration of radioactivity could pass by over a relatively short period of time, after which the amount of airborne radioactivity could drop substantially. For measurements taken using a conventional fixed filter, all of the accumulated radioactivity remains within a common filter media until it is manually changed/retrieved by a user. In spectroscopy, the error of a signal (inherent in the signal, in addition to other uncertainties from Compton background or peak interferences) is for the purposes of this description considered to be equal to the square root of the signal, in this case the count rate on the filter, such that:

$$\delta\dot{C}_i = \sqrt{\dot{C}_i} \quad (6)$$

Under these conditions, e.g., without changing the filter or waiting for radioactive decay, the count rate measured by a conventional system would remain high, and this error would tend to increase the scatter in the data taken after the airborne radioactivity concentrations drop back down at the end of the high concentration episode.

In contrast, the systems described herein can be configured to automatically use two or more filters over a given detection period which may help improve the temporal resolution of the measurements and address some of these known challenges. The system also preferably includes at least two different types of filters, such as at least one aerosol filter and at least one iodine filter, that can be configured to capture different radionuclides from an incoming air sample. Preferably, the system can separately detect the radionuclides capture on each filter, and more preferably is configured so as to be able to differentiate between aerosol and vapor iodine species. Such systems may use a second set of iodine-specific charcoal filters as well, as described herein. The in-situ measurements can then be accomplished with a pair of CZT gamma spectrometers (or other suitable detectors, one associated with each filter), and these can collect data while the system is sampling from the air.

Figure 2:
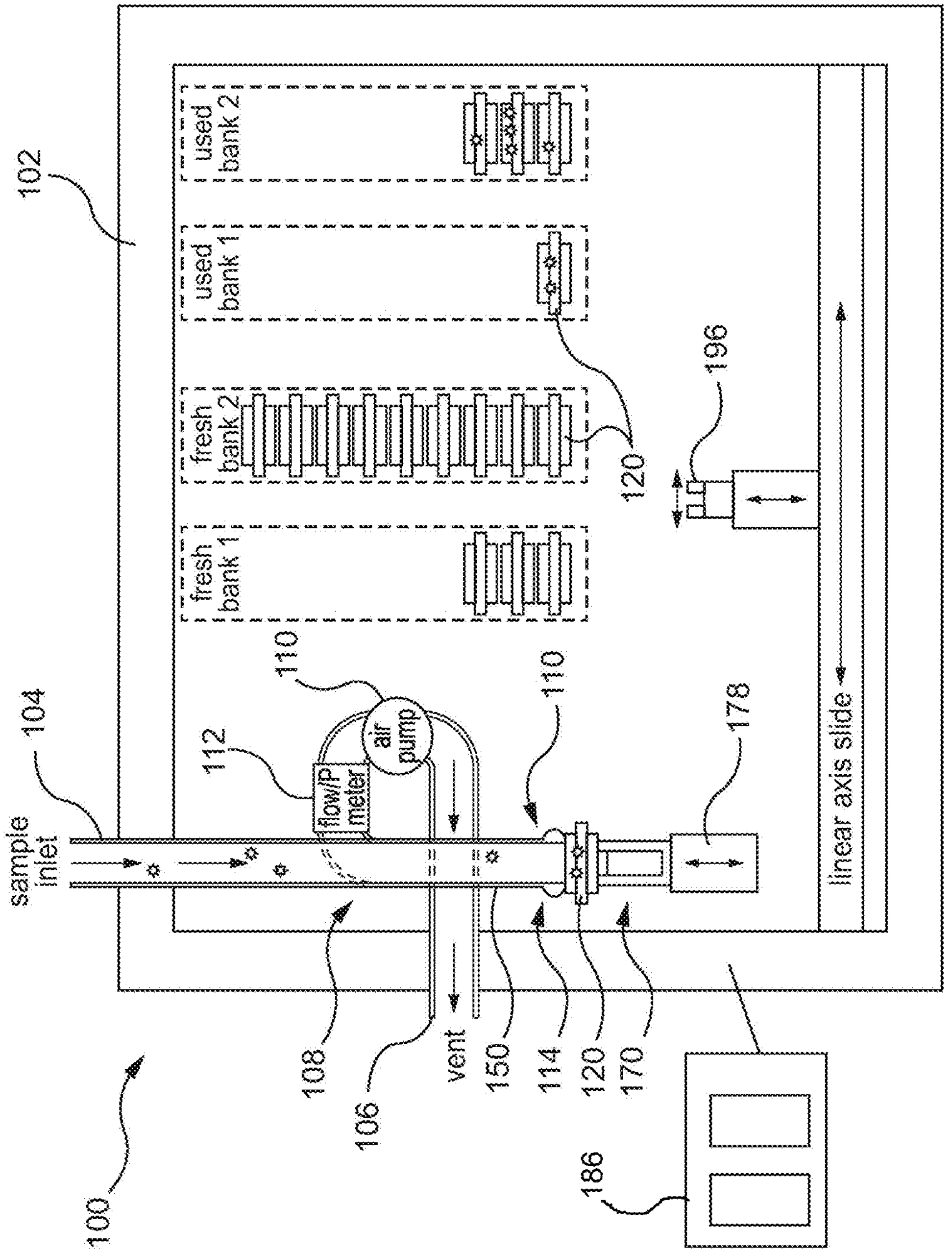
FIG. 2 is schematic representation of one example of a system for measuring airborne radionuclides.
Figure 3:
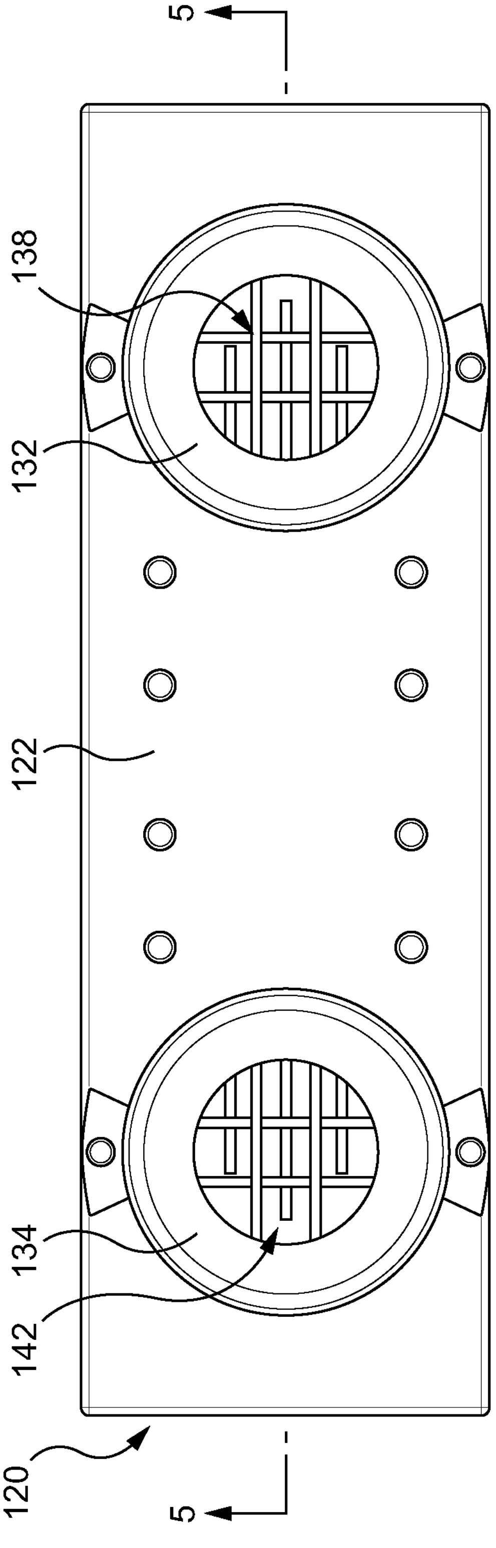
FIG. 3 is top view of one example of a filter cartridge.
Figure 4:
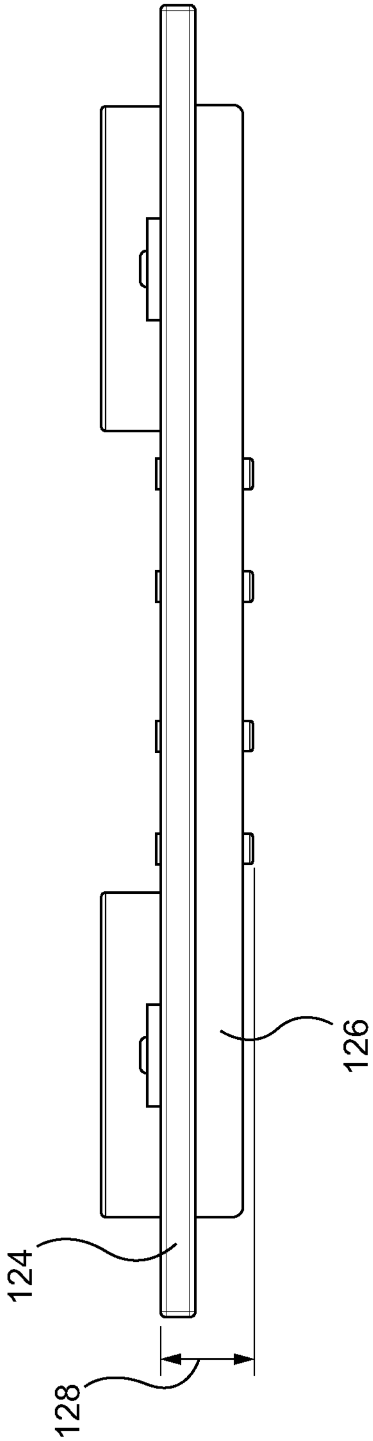
FIG. 4 is a side view of the filter cartridge of FIG. 3.

Referring to FIG. 2, a schematic representation of one example of a portable system 100 for measuring airborne radionuclides from a target environment is illustrated. The system 100, and its components, are intended to be sufficiently portable, and optionally generally self-contained, such that the system 100 can be transported to an area or environment where a measurement of airborne radionuclides is desired, such as the area surrounding a nuclear power station or other potential source of airborne radionuclides. For the purposes of the present teachings, such areas can be considered to be the target environment and positioning the system within such environments is considered to be positioning the system 100 in situ or on site and is generally understood to be generally different from a laboratory or other building/environment that is remote from the area where airborne radionuclides are expected/suspected.

In this schematic example, the system 100 includes a system housing 102 that can support and/or contain the other system components. The housing 102 may be a generally solid housing, for example to help protect the interior components from rain, dust and other atmospheric contaminants, and may have solid or substantially solid walls, preferably with one or more openable doors or panels to provide access to the interior of the housing 102. Alternatively, the housing 102 may be a generally open, frame-like structure with some support points for attaching and mounting other system components but need not have a protective shell or the like. While schematically shown as a single, generally continuous structure, in some examples the housing 102 may include two or more separate housings, modules, containers or other such structures that collectively can be considered to be the housing of the overall system 100. Regardless of its overall configuration, the housing 102 can include a variety of suitable openings to accommodate the air sampling described herein, and to provide connections to any external modules that can interface with the system 100, such as power sources, controllers, communication and data connections and the like.

The housing 102 and the components it supports are preferably sized so as to be generally portable, and transportable from a storage location to an active, target location when use of the system 100 is desired. Accordingly, the housing 102 is preferably sized so that it can be carried by a user, or alternatively so that it can be handled using a suitable apparatus (such as a lift truck or crane) and can be transported on a conventional vehicle (such as a passenger car or van, a pick-up truck, airplane, ship, transport truck or the like) in order to be deployed in the target environment.

In this example, the system 100 includes a system gas inlet 104 through which samples of the air, and other gases from the surrounding, target environment can be drawn into the system 100 for measurement. In this illustrated example, the system gas inlet 104 is provided in the form of the open end of a conduit that extends within the housing 102. The system 100 also includes a system gas outlet 106 through which air can exit the housing 102 when the measurements described herein are complete. The gas outlet 106 may be connected to any suitable downstream processing apparatus if desired, or alternatively, as illustrated in this example, can be a generally open end of an airflow conduit that allows the exhausted air to simply vent back into the surrounding atmosphere.

A primary system gas air flow path 108 extends between the system gas inlet 104 and the system gas outlet 106 and provides the path thorough which air can flow through the system 100. In the examples described herein, the system gas air flow path 108 includes a plurality of different sections of piping/conduits that can be connected to each other when the system 100 is in use to provide a generally continuous, one-directional air flow path through the system 100. Preferably, at least some portions of the gas air flow path 108, including one or more of the conduits and other such structures, can be formed from a generally non-reactive material, such as glass, to help reduce chemical interactions between the incoming air sample and parts of the system 100 that are upstream from the filter cartridge(s). To help the system 100 operate as described herein, a variety of different air flow devices such as pumps and compressors, valves, pressure sensors, flow sensors, temperature sensors and other suitable apparatuses and sensors can be provided along the air flow path 108. In this schematic example, an air circulating pump 110 and a flow and pressure meter 112 are included as exemplary illustrations of such features.

In addition to the air flow devices, the system 100 includes a cartridge dock 114 that is provided in and helps form part of the primary air flow path 108. The cartridge dock 114 is a part of the system 100 that is configured to detachably connect to the filter cartridges that are used to help capture the airborne radionuclides and hold them for measurement and detection using the system 100 as described herein. The cartridge dock 114 can therefore have any configuration that is suitable for connecting with a given filter cartridge design and will preferably have complimentary coupling and sealing portions to help provide a substantially gas-tight connection between the cartridge dock 114 and the interchangeable filter cartridges. Preferably, the system 100 is configured so that when a filter cartridge is coupled to the cartridge dock 114 it helps complete the primary air flow path 108 such that air can travel from the system gas inlet 104 to the system gas outlet 106 by passing through both the cartridge dock 114 and the connected filter cartridge. In this arrangement, when a filter cartridge is removed from the cartridge dock 114 it can interrupt the primary air flow path 108.

To capture the airborne radionuclides, the system 100 includes at least one filter cartridge, and preferably as described herein, can include a plurality of interchangeable filter cartridges that can be connected to the cartridge dock 114 over the course of a detection period while the system 100 is in use. In the illustrated example, multiple suitable filter cartridges 120 are shown as being part of the system, including a plurality of fresh or unused cartridges 120 and a plurality of used cartridges that have captured at least some quantity of airborne radionuclides and/or other contaminants as schematically illustrated by the presence of one or more small circles on the cartridge 120.

Referring also to FIGS. 3-6, one example of a filter cartridge 120 that is suitable for use with the systems 100 described herein includes a cartridge housing 122 that, in this example, includes and upper wall 124, an opposing lower wall 126 that is spaced from the upper wall 124 by a cartridge thickness 128 and a sidewall 130 that extends between the upper and lower walls 124 and 126. Together, the walls 124, 126 and 130 cooperate to surround an interior air flow passage or cartridge flow path 133 within the filter cartridge 120.

This filter cartridge 120 is configured to hold two filters and to allow air to pass through the body of the filter cartridge 120 such that it can form part of the overall, primary air flow path 108 when the filter cartridge 120 is in use. In this example, the filter cartridge 120 includes an air inlet 132 that can be connected to the air flow conduits (such as to the sample supply port and exhaust port, respectively, as described herein) that form part of the primary air flow path 108 in a generally air-tight manner so that air can flow into the filter cartridge 120. In this example the air inlet 132 is a hole/aperture formed in the upper wall 124 of the filter cartridge 120 but may have different configurations in different examples.

The filter cartridge 120 also includes an air outlet 134 that can be connected to another conduit forming part of the primary air flow path 108 when the cartridge 120 is in use. An internal cartridge flow path 136 (see FIG. 5) extends between the air inlet 132 and air outlet 134 and provides air flow communication through the cartridge 120.

The filter cartridge 120 in this example is configured to hold two filters that are to be positioned within the primary air flow path 108 so that material that is traveling through the air flow path 108 with the air sample will get caught on the filter(s) and can be retained for measurement and analysis. For example, the air pump 110 can be configured to turn on once the cartridge 120 is in place may start drawing air in (for example at about 5 L/min as illustrated), and the flow meter and pressure sensor 112 can be used to monitor the air sampling rate. The gamma spectrometers may start counting when the air pump 110 turns on and may, along with the controller 186, tracks the radionuclide activity as it accumulates on the filters within the cartridge 120 as described herein. Other apparatus, valves and the like can be provided in other examples.

Figure 5:
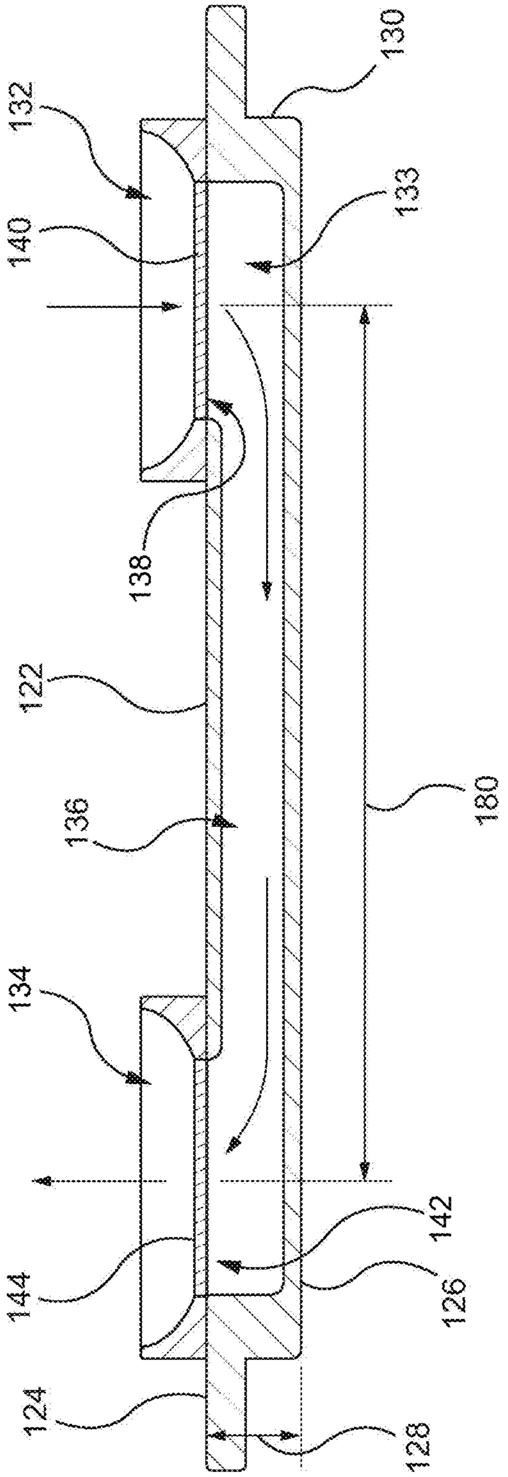
FIG. 5 is a cross-sectional view of the filter cartridge of FIG. 3, taken along line 5-5.

The filters may be positioned anywhere within the cartridge airflow path 136 that is suitable, and may be positioned in parallel, or preferably in series with each other. In this example the cartridge 120 includes a first filter chamber 138 that is defined by portions of the housing/body of the cartridge 120 and is configured to house a first filter 140 (FIG. 5). The first filter chamber 138 in this example is positioned at the air inlet 132 (but could be in another location in other examples).

Preferably, the first filter 140 is sized to generally match the dimensions and shape of the first filter chamber 138 and is exposed to the incoming air flow. The first filter 140 can be any suitable type of filter media that is appropriate for capturing the target airborne contaminants, preferably can be an aerosol filter that is formed from a suitable material, such as cellulose and is operable to capture particulates from the passing air. One example of a suitable aerosol filter is a Whatman® qualitative filter paper, Grade 1 (WHA1001047). Optionally, the first filter chamber 138 can be openable to allow the first filter 140 to be inserted and removed as desired. In some examples, a used filter may be removed from the filter cartridge 120 and may be replaced with a fresh filter media. This can allow a given filter cartridge 120 to be used multiple times.

This cartridge 120 also includes a second filter chamber 142 that is downstream from the first filter chamber 138 and is, in this example, located at the air outlet 134 (but could be in another location in other examples). The second filter chamber 142 is configured to hold a second filter 144. The second filter 144 could be the same type of filter as the first filter 140, but preferably is a different type of filter-such as an iodine-specific charcoal filter—that is configured to capture a different type of airborne contaminant than the first filter 140. In this arrangement the filter cartridge 120 can be considered a two-stage filter, and different types of contaminants will be caught on the different filters 140 and 144 that are positioned in different locations. This may help facilitate the independent measuring the contaminants on the filters 140 and 144, which may allow the system 100 to separately monitor Because each filter cartridge 120 is intended to be used for a predetermined use period, it may be advantageous the cartridges 120 can be connected and disconnected to the air flow path 108 in a relatively easy manner, and preferably in a generally one-step processes that does not require the separate activation or manipulation of a fastener, connector or the like in order to establish the desired, air-tight seal. For example, in may be preferable in some examples of the system 100 that the cartridges 120 can be coupled to the corresponding portions of the system (such as the cartridge dock 114 as described herein) via movement in single coupling direction, such as a translation of the cartridge in an insertion/removal direction. Optionally, the insertion/removal direction can be a generally linear movement path, and the cartridge 120 can be moved via a suitable linear actuator or the like. This may help facilitate automated attachment and removal of cartridges 120 and may reduce or possibly eliminate the need for a user to manually attach or remove the cartridges. Enabling this type of relatively simple attachment and removal can include having appropriate coupling and sealing features on the filter cartridge 120, and complimentary coupling and sealing features on the other portions of the system 100. Any suitable, complimentary set of features may be used.

Figure 6:
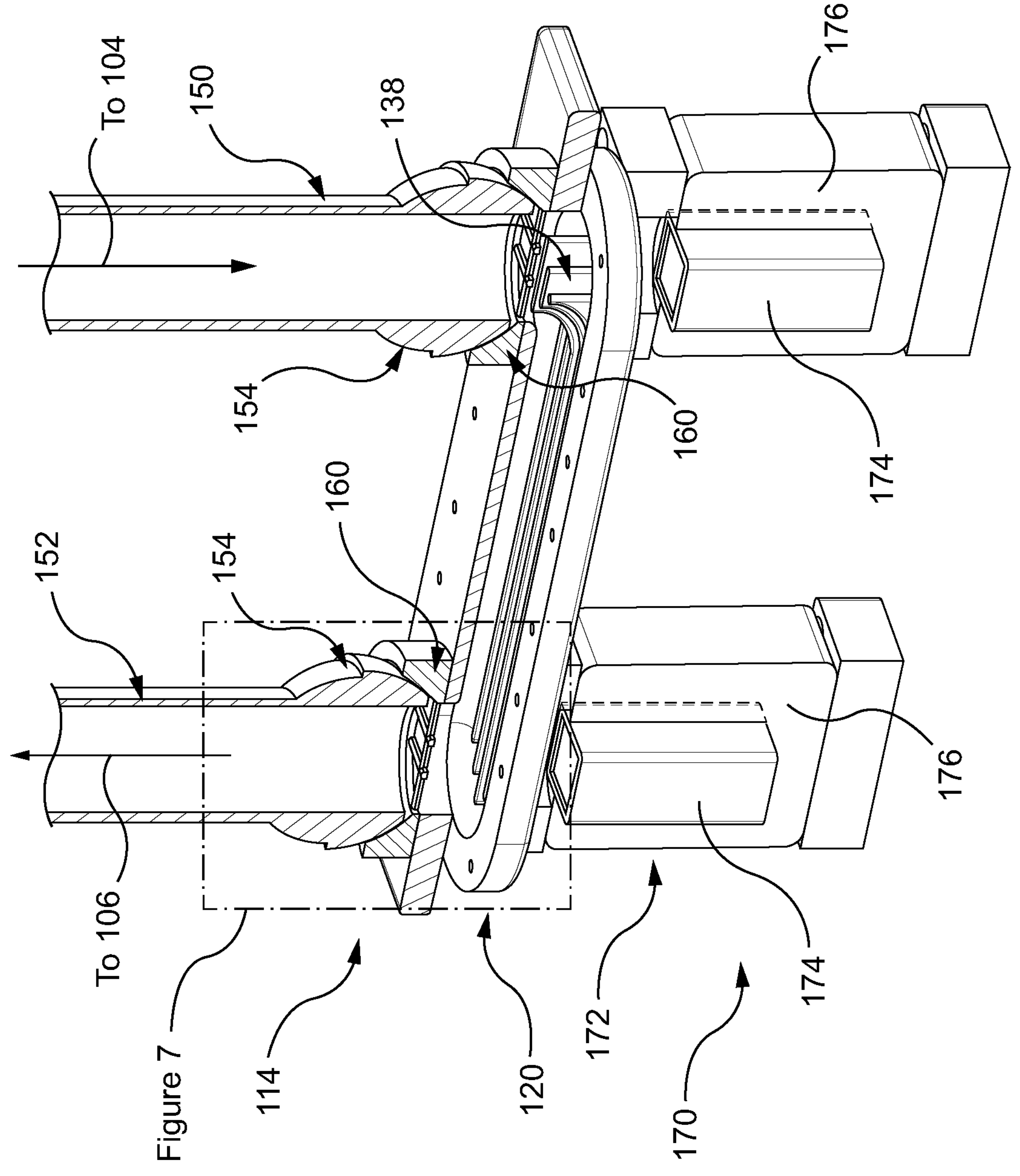
FIG. 6 is a partial cross-sectional illustration of portions of a system for measuring airborne radionuclides.
Figure 7:
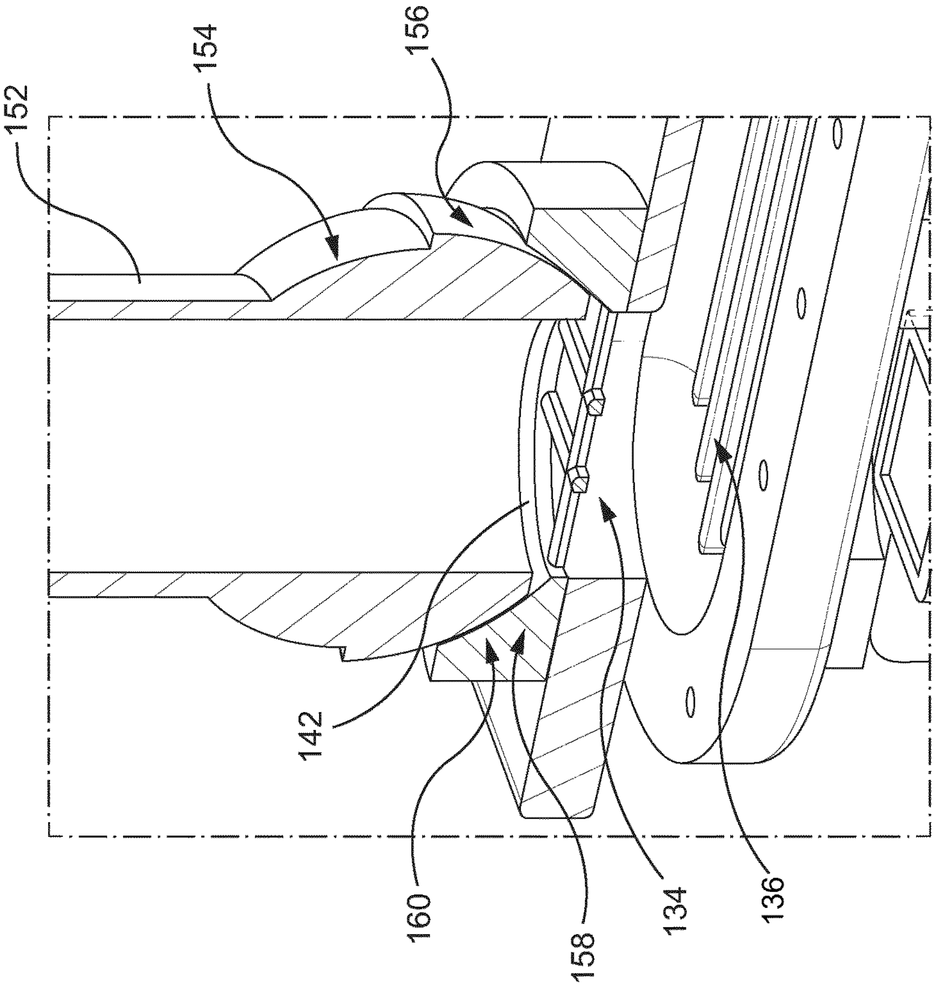
FIG. 7 is an enlarged view of a portion of FIG. 6.

Referring to also to FIGS. 6 and 7, an enlarged view of a portion of the system 100, illustrating some of the features of the cartridge dock 114 is illustrated. In this example, the cartridge dock 114 includes at least a portion of a filter supply conduit 150, terminating in an air sample supply port, and a filter exhaust conduit 152, terminating in an exhaust port, that form part of the primary air flow path 108. Each conduit 150 and 152 terminates in an open, free end that is provided with a dock coupler 154. In this example, the dock couplers include generally round, ball joint features that are provided at the sample supply port and exhaust port at the ends of the conduits 150 and 152. The ball joints at the ports can have generally smooth and convex outer surfaces, such as lower convex sealing surface 156 as illustrated in FIG. 7. These surfaces can form a least part of the seal with the cartridge 120. To provide a complimentary, concave sealing surface that can engage and seal with the sealing surface 156 the filter cartridge 120 illustrated in this example includes a cartridge coupling member 158 that is provided in the form of a generally annular sealing member that has a concave sealing surface 160 that is configured to seal against the convex sealing surface 156 when the cartridge 120 is docked as shown in FIG. 7. To disconnect the cartridge 120, it can be moved linearly away from the cartridge dock 114, downwardly as illustrated in FIG. 7, to disengage the concave sealing surface 160 that is configured to seal against the convex sealing surface 156. In this example, the cartridge coupling members 158 laterally surround the gas inlets and outlets 132 and 134, and the first and second filter chambers 138 and 142.

In the illustrated example, moving the cartridge 120 linearly away from the cartridge dock 114 will automatically interrupt the air flow connection between the cartridge 120 and the primary air flow path 108 and can also expose the filters 140 and 144 that are housed in their respective filter chambers 138 and 142. This may eliminate the need to touch or open a chamber door or other such structure in order to inspect or access the filters 140 and 144.

When the cartridges 120 are connected to the cartridge dock 114 and the system 100 is in use, airborne contaminants that are entrained in the air drawn into the primary air flow path 108 can be caught in the filters 140 and 144. As the contaminants accumulate on the filters 140 and 144 the amount and/or type of contaminants can be measured by the system using a suitable sensor, such as gamma detector as described herein. Because different types of contaminants may be retained in the different filter types 140 and 144, measuring the gamma radiation emitted from each filter 140 and 144 separately may allow the system 100 to simultaneously detect and/or measure the concentration of two or more different types of airborne contaminants.

Referring again to FIGS. 2 and 6, in the illustrated example the system 100 includes a gamma detector apparatus 170 with a sensor portion 172 that can be positioned adjacent the filter cartridges 120 and aligned or registered with respective filters 140 and 144 when the system 100 is in use, as shown schematically in FIG. 6. The sensor portion 172, and optionally other parts of the gamma detector apparatus 170, is preferably movable so that it can be moved between a measurement position as shown in FIG. 6 in which it is adjacent the first filter cartridge, and an exchange position (see FIG. 8), in which the sensor portion 172 is spaced apart from the filter cartridge 120 by a distance that is sufficient to allow the filter cartridge 120 to be vertically detached from the cartridge dock 114. While the sensor portion 172 is in the exchange position a used cartridge 120 can be removed from the cartridge dock and replaced with a fresh cartridge 120. With a fresh cartridge 120 in place, the sensor portion 172 can be returned to the measurement position (see also FIG. 10).

In this example, the sensor portion 172 includes two separate gamma spectrometers 174, each contained in a respective shielded housing 176 that can be a tungsten shield or the like, which may help reduce the detection of false radioactivity readings from the surrounding environment. Such shielding may be important in some situations, such as when the system 100 is deployed near nuclear power plants during an emergency, where the environment around the system 100 may be contaminated. Optionally, a tungsten collimator (e.g., a 20 mm high, 35 mm internal diameter in some examples) may be placed between the spectrometers 174 and the cartridge 120 to help further narrow the field of view. This type of directionality and limiting of exposure for each spectrometer 174, for example by using the collimators described or other such hardware, may help to prevent radioactivity from, for example, the aerosol filter 140 from being viewed by the spectrometer 174 that is focusing on the iodine filter 144, and vice versa.

To help reduce the chances of such mixed readings between the spectrometers 174, the filter chambers 138 and 142, and filters 140 and 144 therein, are preferably laterally spaced apart from each other by an offset distance 180 (FIG. 5) that is between about 2 cm and about 50 cm and may be between about 5 cm and about 20 cm (e.g., in a horizontal direction as illustrated in FIG. 5).

When the sensor portion 172 is in the measurement position, each spectrometer 174 is aligned with a respective one of the filters 140 and 144. In this arrangement, one of the spectrometer detectors 174 can generate a first detection signal that is based on the gamma radiation in the first filter 140, and the second of the one of the spectrometer detectors 174 may generate a second detection signal that is based on the gamma radiation in the second filter 144. These signals may be sent to the system controller 186 for processing. The controller 186 can then generate suitable user outputs and/or output signals. The first and second detection signals may be different if different amounts of radiation are detected in the filters 140 and 144.

Similarly, positioning the spectrometers 174 relatively close to the filters 140 and 144 in the axial direction (e.g., vertically as illustrated in FIG. 6) may help improve the quality and/or accuracy of the measurements. One factor that can affect the vertical/axial spacing between the spectrometers 174 and the filters 140 and 144 is the thickness 128 of the cartridge 120. Preferably, the cartridge thickness 128 is relatively small, so that the gamma spectrometers that are positioned adjacent the lower wall 126 can still be sufficiently close to the filters within the cartridge to obtain a useful measurement. Optionally, the thickness 128 may be less than about 20 cm, and preferably can be less that about 10 cm, and between about 3 and 6 cm. Preferably, the spectrometers 174 are positioned as close to the filters 140, 144 as practical as this can help increase signal quality.

Figure 8:
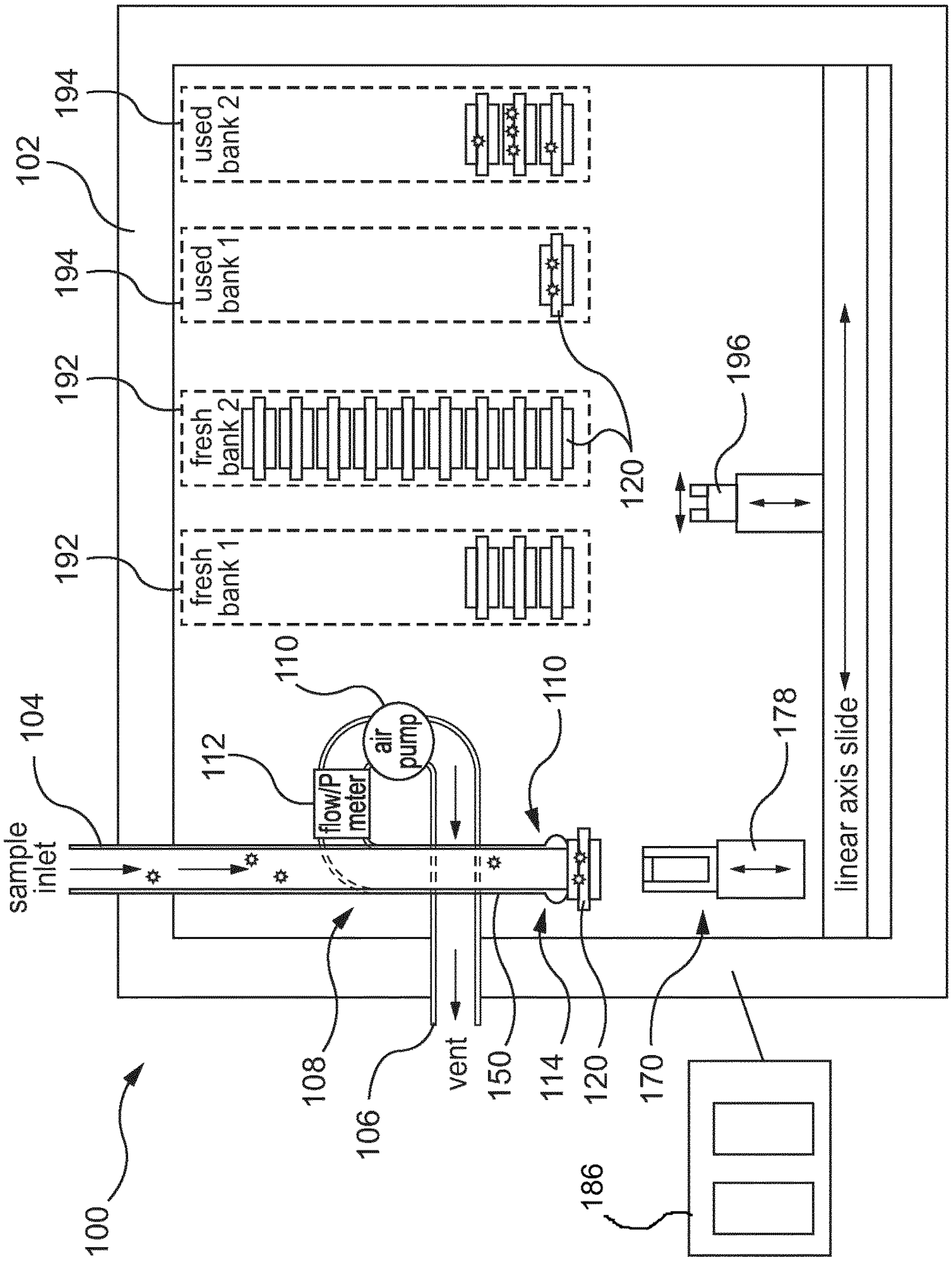
FIGS. 8-11 are representations of the system for measuring airborne radionuclides of FIG. 2 in different configurations.
Figure 9:
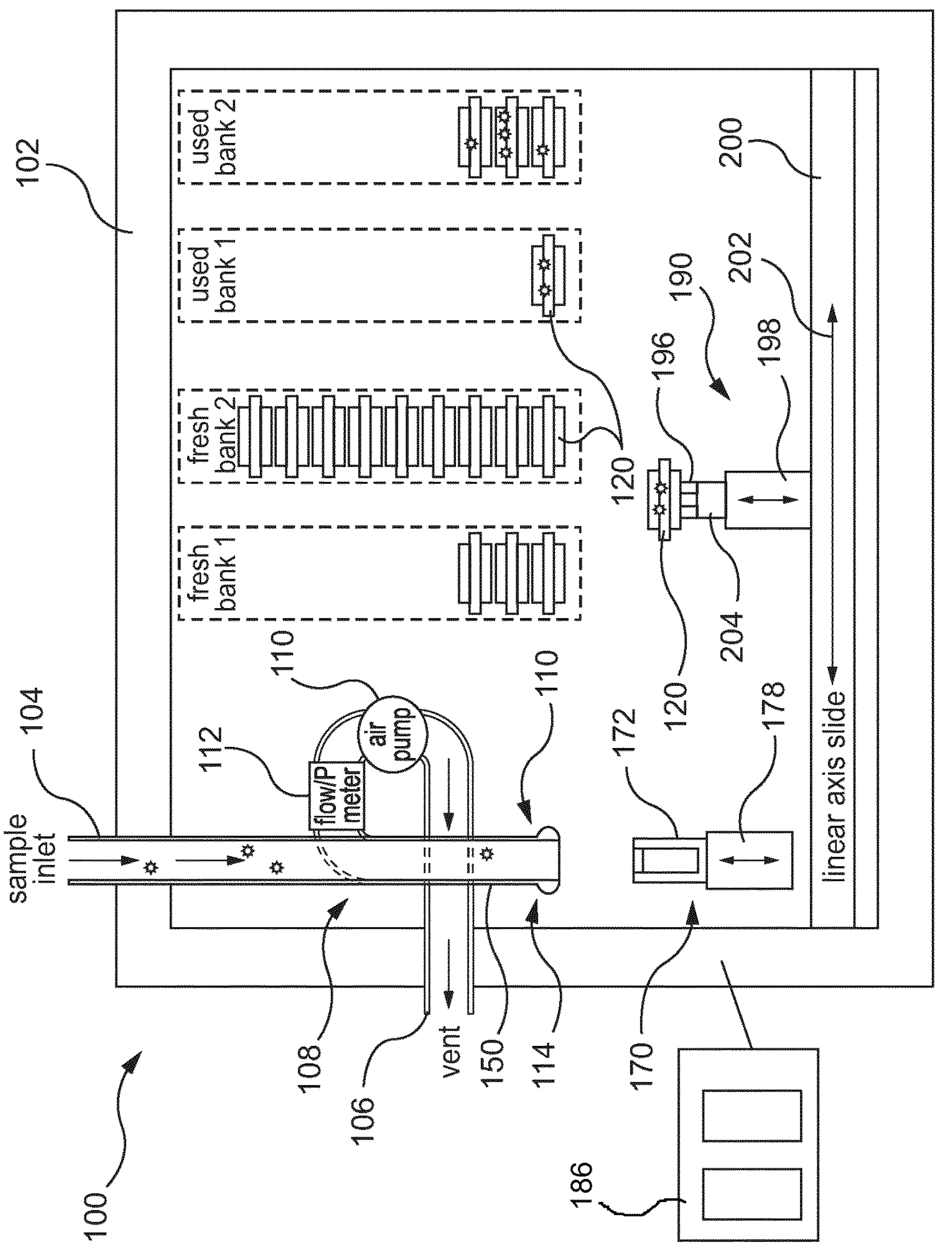

To help move the sensor portion 172 in this manner, the gamma detector apparatus 170 can also include any suitable type of actuator, such as the detector actuator 178 schematically illustrated FIGS. 2 and 8-9 and 11, that can support the sensor portion 172, and move it between the measurement position (FIGS. 2 and 11) and the exchange position (FIG. 9). This the detector actuator 178 can include a linear actuator and may be pneumatically, hydraulically or electrically powered, or may be any other suitable apparatus. The detector actuator 178 is preferably communicably linked to the controller 186, such as by a wired or wireless connection, and supports the sensor portion 172.

Preferably, the detector actuator 178 can be controlled independently of the cartridge handling apparatus described herein, but optionally the movements of the different actuators can be coordinated, such as by the controller 186 to help facilitate the cartridge exchanges described herein.

To help facilitate the exchange of the cartridges 120, and operation of the system 100 in a generally autonomous manner, the system can include a suitable cartridge handling apparatus 190 that can be controlled by the controller 186. The cartridge handling apparatus 190 is preferably configured to be able to remove the one, used filter cartridge 120 from the cartridge dock 144 at the end of its cartridge use period and to then connect a replacement, fresh filter cartridge 120 to the cartridge dock 114 without the need for intervention by a human user/operator.

Preferably, to help manage the supply of cartridges 120 the system 100 can include at least one fresh cartridge bank that is able to hold one or more unused cartridges, illustrated schematically in FIG. 8 as fresh bank 192. Similarly, the system 100 preferably includes at least one used cartridge bank that is able to hold one or more used cartridges, illustrated schematically in FIG. 8 as used bank 194.

Figure 10:
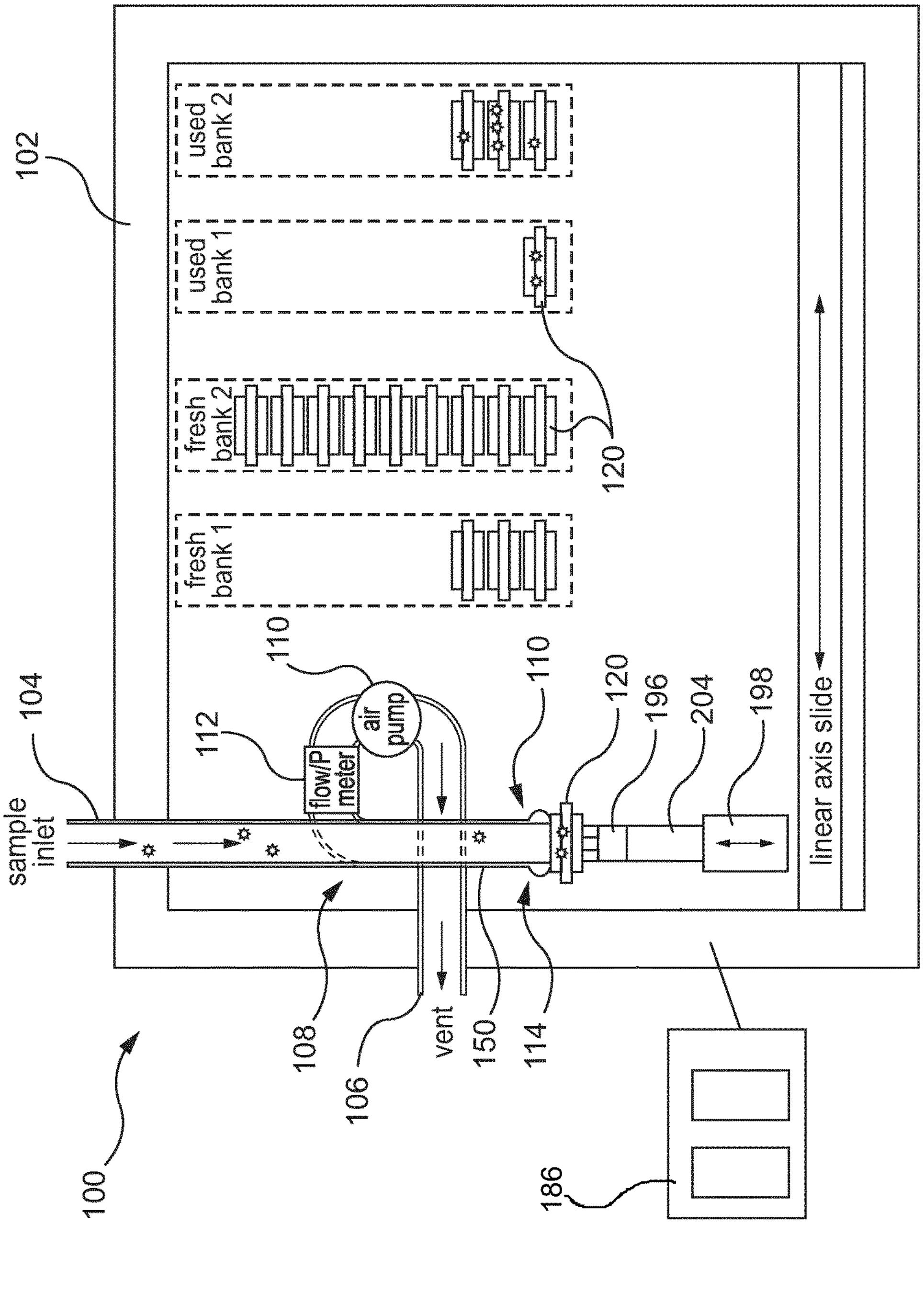
Figure 11:
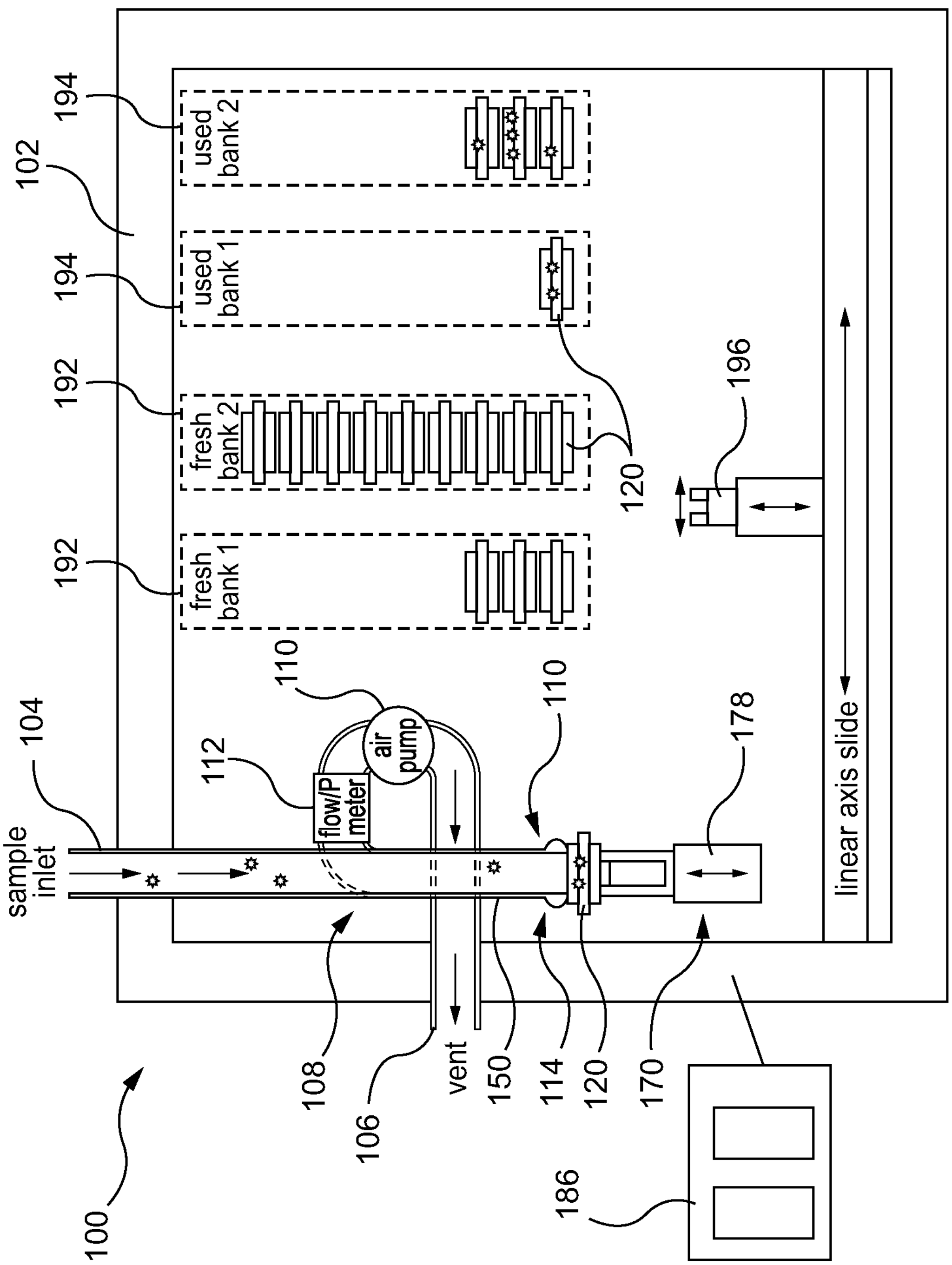

In this example, the cartridge handling apparatus 190 is therefore preferably configured to retrieve used cartridge 120 from the cartridge dock 114 (see FIGS. 2, 8 where the sensor portion 172 is moved to the exchange position and 9) and convey it toward the used bank 194. An unused cartridge can then be obtained from the fresh bank 192 and the cartridge handling apparatus 190, can connect it to the cartridge dock 114 (FIG. 10). The sensor portion 172 can then be returned to the measurement position (FIG. 11) for the suitable cartridge use period. A variety of apparatuses may be used for this purpose.

In the illustrated example, the cartridge handling apparatus 190 is schematically illustrated as including an end effector portion, such as a pneumatic gripper 196 that can grasp the cartridges 120. The pneumatic gripper 196 is preferably movable in at least two degrees of freedom to help achieved the desired cartridge handling operations. For example, in this case cartridge handling apparatus 190 includes a carriage 198 that is mounted to and can slide along a rail 200 in a first, lateral translation direction 202. In this example the rail 200 is illustrated as being linear/straight, but may have other shapes (e.g., curved, inclined, etc.) in other examples.

An extension unit 204 is mounted and is translatable with the carriage 198 and supports the pneumatic gripper 196 (FIG. 9) and can extend in a second direction to move the cartridge 120 toward and away from the cartridge dock 114. This may include a pneumatic piston/cylinder, ball screw, scissor lift, linear rail or other such hardware. In this example, the extension of the extension unit 204 is generally orthogonal to the movement of the carriage 198, but in other examples may be of a different arrangement.

The system controller 186 is illustrated schematically in the examples herein, but may be any suitable computer, processor, programmable logic controller and the like that can be connected to the components of the system 100, such as the cartridge handling apparatus, the gamma spectrometers, gas handling equipment and the like. The system controller can be communicably linked to these various components using any suitable communication hardware/protocol, including wires, wireless connections (such as BlueTooth or WiFi), infrared communication devices, radio transmitters/receivers and the like.

The system controller can include any suitable input and output devices to allow a user to interface with the system, including a keyboard, mouse, track pad or other input device, a monitor/screen, speakers or other sound producing transducers, lights, voice/speech capabilities, an interface with an app or other similar software running on a parallel device (such as a smart phone, tablet or the like) and other suitable devices.

While schematically shown as a single unit, the system controller may, in some examples, include multiple different, physical devices that are separate from each other but that a in communication with each other and can function together to perform the functions of the system controller described herein.

When the system 100 is in use, the gamma spectrometers 174 can each generate respective sensor output signals that are proportional to the number of radionuclides that are captured/present in the filter 140 or 144 they are aligned with. These signals may be any suitable format and can be provided to the controller 186. The controller 186 can then generate a suitable output based on the received sensor data. This output can include recording data associated with the sensors, such as radiation levels, identification or classification data that can help identify the particular airborne contaminant that is present in the sample and the like. The controller 186 can also utilize other incoming data/information, such as weather data, temperature, time, location data and other suitable data. These different sources of data can be utilized by the controller 186 to generate one or more desired user outputs, such as a time-based record of the measured radiation levels, graphs, reports, on-screen displays, warnings or alerts (for example if a recoded value exceeds a pre-determined alarm threshold) and other such outputs. The user outputs may be locally generated by the controller, such as by sounding an alarm or triggering a light, and/or the information may be communicated to an outside or remote device that is physically separate from the housing 102, such as a computer, tablet, smart phone or the like.

Figure 12:
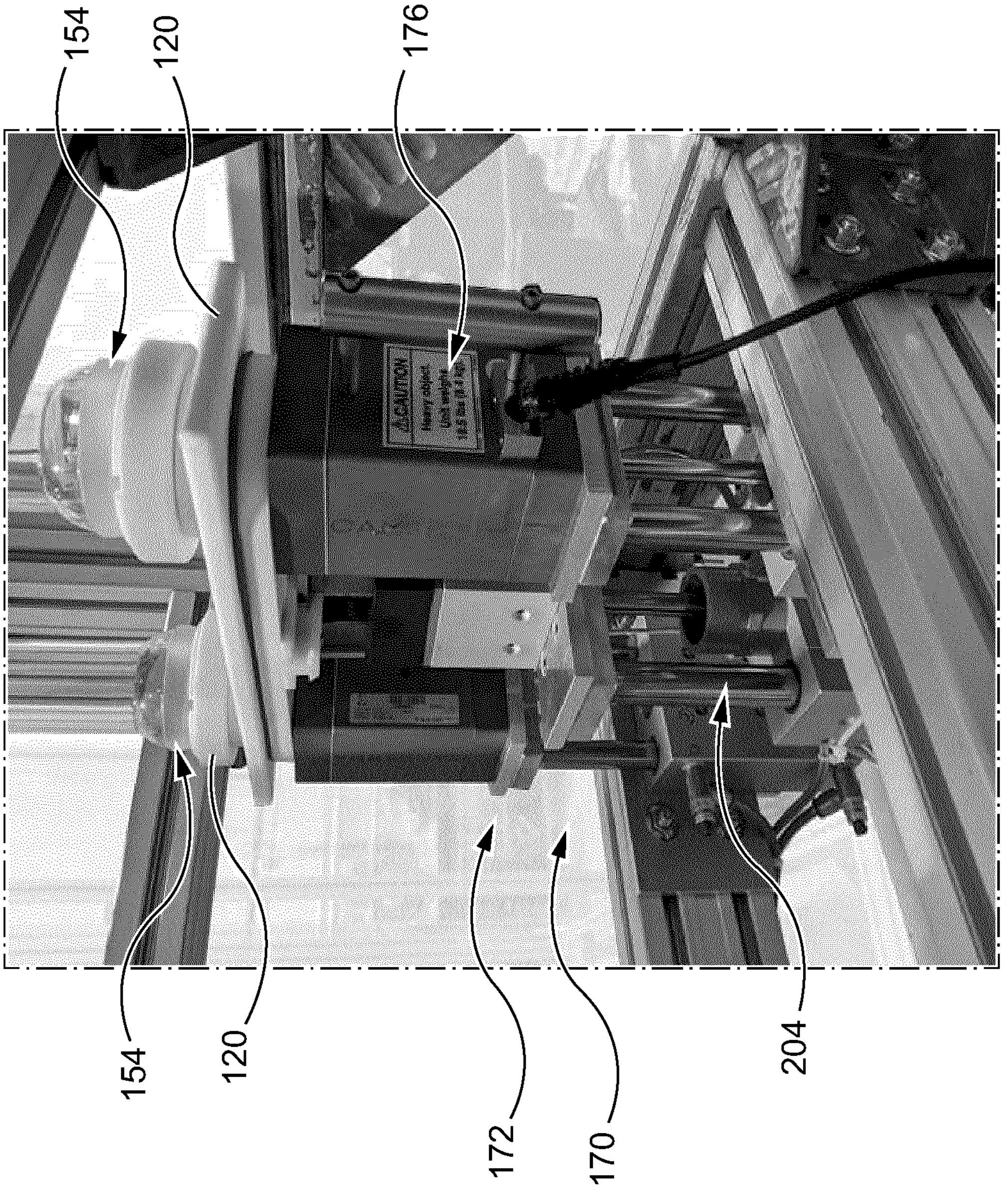
FIG. 12 is a photograph of portions of a prototype example of a system for measuring airborne radionuclides from a target environment.

To confirm the operation of the system 100 described herein, a prototype system was constructed for testing purposes. Referring to FIG. 12, a photograph of a portion of the prototype apparatus is shown. Portions of the prototype are similar to portions of the system 100, and like features are identified using like reference characters. FIG. 12 shows an example test cartridge 120 that is connected to a cartridge dock 114, with the sensor portion 172 positioned in the measurement position.

The two gamma spectrometers in this example are Kromek GR1 CZT detectors, and the Kromek MultiSpect Analysis software is employed on the system controller 186 to capture and record the gamma spectrometry measurements. The tungsten shields 176 were from the Canberra CSM-GR1 system. Early prototypes of the filter cartridges 120 were 3D printed out of polylactic acid (PLA), and other versions were manufactured out of PTFE. Festo components were employed for the linear axis slide, pneumatic pistons, and pneumatic grippers, along with the control software and other accessories to provide portions of the detector actuator 178 and the cartridge handling apparatus 190.

The in-situ detector efficiency of this prototype was evaluated using a set of fixed sources, which were placed on the aerosol or iodine filters for counting to simulate the collected radioactivity. Two different sources were employed: a $6.47\times10^3$ Bq $^{152}$Eu source with gamma energies of 40.1 keV, 121.8 keV, and 344.3 keV, and a mixed source with $5.86\times10^3$ Bq of $^{241}$Am and $1.31\times10^4$ Bq of $^{137}$Cs with gamma energies of 59.5 keV and 661.7 keV. Both sources were 40 mm diameter discs that fit within the filter chambers. Four measurements were done with each source being placed over either the aerosol or iodine filters, and these were done for 5 minutes each. The in-situ efficiency could be evaluated by comparing the net count rate over the time period to the known activity of each radionuclide and the relative intensity of the gamma rays. This is shown as a function of gamma energy for the aerosol-filter detector and iodine-filter detector in FIG. 13*a*. In this test the filters were 56 mm above the top of the CZT spectrometers.

Using the measured detector efficiency as described herein, an expected performance of the proposed air sampling system was modelled, against a hypothetical mix of radionuclides in air samples. The detector count rates over time and the cartridge changing frequency (e.g., the length of a given cartridges use period) were particular targets of this assessment.

A sampling time-based algorithm is used to decide when to change the cartridges. A maximum acceptable count rate, $\dot{C}_{i,max}$, is established, and compared to the actual count rate in the energy range of a radioisotope of interest, $\dot{C}_i$, and the time that the filter cartridge has been in place so far, $t_f$, and this $t_{f,max}$ value is evaluated up to a maximum of 24 h, as given in Equation 7. The $\dot{C}_{i,max}$, value is energy-dependent, as the higher energy gamma emissions have a lower detection efficiency. This metric is evaluated continuously as data is being recorded, but its minimum value throughout that time period is used as the basis of comparison. When the actual time that the cartridge has been in place exceeds $t_{f,max}$, the filter is changed. When air concentrations are increasing, $t_{f,max}$ will shrink rapidly as $\dot{C}_i$ approaches $\dot{C}_{i,max}$, and the filter change will occur when it does so. When air concentrations are decreasing, C; would plateau and stop increasing as fast, and so a $t_{f,max}$ value from earlier in the sampling period to establish the maximum sampling period.

$$t_{f,max} = \min\left(24\text{ h}, \frac{\dot{C}_{i,max}}{\dot{C}_i} t_f\right) \tag{7}$$

A hypothetical case involving a time-varying mixture of $^{131}$I, $^{137}$Cs, and $^{103}$Ru in the air, released from a nuclear power plant accident, was simulated. The simulated count rate on the aerosol filter-facing detector is given in FIG. 13*b*, and the real and reconstructed air concentrations of each radioisotope is shown in FIG. 14. To be more realistic, noisy count rates were generated by sampling from a normal distribution with an expected value, $\mu=\dot{C}_i$, and standard deviation, $\sigma=\sqrt{\dot{C}_i}$, of the count rate from Equation 5. In the scenario, there was an initial period about 12 hours after the start of the accident with major releases and very high outdoor radionuclide concentrations, followed by an intermediate period with lower releases, and a second stage of large late releases after about 40 hours. The airborne concentrations decreased significantly after the second period of large releases. The major $^{131}$I and $^{137}$Cs release occurred during the same time windows, but the large $^{103}$Ru releases during the initial major spike had a longer duration.

Based on the inventors' analysis of the model, including FIG. 13*b*, it was determined that it may be desirable for the filter cartridges 120 to be changed quite frequently during the major spikes. In both spikes, the sampling duration was only around 30-40 minutes. The reconstructions of the airborne concentrations generally closely matched the actual concentrations that were simulated, as shown in FIG. 14. These were given in the figure in 10-minute increments, which allows for a relatively higher time resolution for data reporting than would normally be possible for fixed filters that are manually collected and analyzed in an external laboratory. The data for $^{137}$Cs was noisier than that of $^{131}$I and $^{103}$Ru in this testing, possibly because of the smaller count rates and lower outdoor concentrations. There were also some periods when the airborne concentrations were over-predicted after a large decrease, which may be a result of the noise in the count rate signal masking the plateau when the amount of new activity accumulating on the filter was decreasing. This may have been caused by the high activity on the filters from earlier when airborne concentrations were higher, and the over-predictions often lasted until the filter 120 was changed. These differences were relatively small and did not appear to materially change the performance of the system 100, but it does underline the need to have a good set of metrics for changing the filters.

Some additional testing of the system 100 was conducted to determine the aerosol retention efficiency and pressure drop across the chosen filter cartridge 120 design. This testing involved testing the pressure drop across the paper (aerosol) and activated carbon (iodine) filters at multiple flow rates, testing the aerosol density measurements before and after each filter at multiple flow rates, conducting a seal test, to determine if the cartridge or associated connections can function as intended, and testing to failure to determine the pressure and flow rate limits of the filters that were used in this first example. This testing was conducted in a suitable test room at the Chalk River Laboratories, operated by Canadian Nuclear Laboratories, in Ontario, Canada.

In one part of the testing, a Whatman® aerosol filter was installed as the first filter 140 at the inlet 132 and an activated carbon iodine filter is installed as the second filter 144 at the outlet 134 of the cartridge. In order to monitor the radioactivity being captured on each filter unit, gamma spectrometers 174 are positioned immediately beneath the filter chambers 138 and 142 in the cartridge 120 as shown schematically in FIG. 6.

FIGS. 15 and 16 are representations of a test apparatus used to conduct the testing described herein. The test apparatus includes an aluminum extrusion frame supporting an assembly of tubing and various instruments and air inputs. The compressed air line 150 is split, one side going to the aerosol generator 220 and the other going to the main air inlet of the tubing assembly. The aerosol generator 220 outputs into the tubing assembly, where a pressure transducer 222 is connected. The flow from the tubing assembly is then directed through a glass tube, with sealing member 154 and into the test cartridge 120, where the aerosols are captured by the filters. Air is then vented out of a second glass tube 152, where the sampling for the optical particle sizer 224 takes place. To capture the baseline concentrations, the aerosol sampling for the optical particle sizer 224 took place at the output of the first glass tube. Different aspects of the test apparatus are listed below.

In this arrangement, the aerosol generator 220 receives compressed air at ~200 kPa and uses that to generate water aerosols at a rate of about 3 mL/min. The liquid in the aerosol generator 220 is a 5 wt % solution of NaCl in water. The water in the aerosols that are produced evaporates after mixing with the main air stream, leaving residual NaCl aerosols. The pressures and flowrates of the air that goes to the main input can be varied to allow for testing of the filter efficiency under different conditions. The tubing assembly, seen in FIGS. 15 and 16, is a series of straight sections and 'T's that allow for the various inputs and sensors to connect.

A list of equipment and instrumentation installed in the test apparatus is given in Table 1.

TABLE 1

| List of equipment/instrumentation and required calibration for each type | |
|---|---|
| Aerosol Generator | Purpose: NaCl aerosol generation<br>Model: TSI-3076<br>Calibration requirements: none |
| Air Supply | Purpose: Air supply<br>Model: n/a (part of LSCF)<br>Calibration requirements: none |
| Pressure Regulator | Purpose: Air supply<br>Model: Festo MS4N-LFR<br>Calibration requirements: none |
| Optical Particle Sizer | Purpose: Record the density and size of airborne particles<br>Model: TSI 3330<br>Calibration requirements: yearly factory calibration |
| Pressure Transducer | Purpose: Measure differential pressure across the filter.<br>10 Volt maximum corresponds to 2 PSI linearly to 0.<br>Model: Omega PX309-002G10V<br>Calibration requirements: factory certification or CNL calibration shop, before start of test and yearly thereafter |

Data that is recorded during the testing includes: particle size distribution of aerosols in positions up and downstream of the cartridge without filters, and downstream of the cartridge 120 with various filters; air supply volumetric flow rate, and differential pressure across the cartridge 120.

Testing was conducted using two different aerosol filters, Whatman® activated carbon loaded paper, Grade 72 and Whatman® glass microfiber filters, Grade GF/A, as shown in FIG. 17. The conditions for the experimental design are given in Table 2. These tests involved keeping the input to the aerosol generator 220 substantially constant (193 kPa and 5 SLPM). Here, "SLPM" refers to standard liters per minute. The flow rate into the tubing fixture was varied from 5 SLPM to 55 SLPM when possible.

TABLE 2

Experimental design, including filter configuration and flow rates

| | Filter Configuration | Flow Rate Range* |
|---|---|---|
| Trial 1 | control (no filter) | 5 to 55 SLPM |
| Trial 2 | control (no filter) | 5 to 55 SLPM |
| Trial 3 | paper only | 5 to 55 SLPM |
| Trial 4 | paper only | 5 to 55 SLPM |
| Trial 5 | activated carbon only | 5 to 55 SLPM |
| Trial 6 | activated carbon only | 5 to 55 SLPM |
| Trial 7 | paper & activated carbon | 5 to 55 SLPM |
| Trial 8 | paper & activated carbon | 5 to 55 SLPM |

*or until filter breaks

The procedure for these experiments was to assembly the cartridge 120 with the filter configuration for the given test. Insert the cartridge 120 into the test apparatus and ensure that the test preparation steps were completed with the PVC air input at the desired rate and the system at a sufficiently stable, steady state. The flowrate through the PVC air-line was then set to the first value in Table 2. After giving time for the pressure to come to steady state, the OPS was run for a standard 1-minute collection time and pressure seen by the transducer is recorded. The air flow rate was then increased by 5 SLPM and the test steps were repeated until either the maximum flow listed in Table 2 is achieved or until the filters ruptured.

No significant leakage was detected throughout any of the tests. This was confirmed with the application of a soap solution at the interface of the glass ball joint and cartridge, in addition to the cartridge-cartridge joints. No bubbles were observed throughout the duration of each test run. These observations, combined with the pressure readings, qualitatively indicate that leakage through the seals is kept sufficiently low and that the design for the cartridge 120 and cartridge dock 114 performs as intended.

The raw data from the pressure drop testing measurements are given in Table 3 to Table 6. Plots of the pressure drop across the filters vs. flowrate with the paper filter only, the activated carbon filter only, and both filters in place, are given in FIG. 18 to FIG. 20, along with a second order polynomial fit to the data. The paper filters tested began to rupture when the pressure differential was about 10 kPa, giving an upper pressure bound for the automation system to use. An example of ruptured paper filters is shown in FIG. 17 (*b*), which tended to tear apart. The activated carbon filters tended to slip out of their frame, rather than tearing. As such, it is recommended that the final radionuclide monitoring system 100 may be operated with overall differential pressures that are preferably less than about 10 kPa with the paper and activated carbon filters both in place, which can correspond to flow rates of about 25 SLPM (see Table 6).

TABLE 3

Raw data, control tests without filters installed

| Flow Rate, | Aerosol Concentration, $\mu g/m^3$ | |
|---|---|---|
| SLPM | Trial 1 | Trial |
| 5 | 90000 | 96000 |
| 10 | 21100 | 57500 |
| 15 | 2720 | 11700 |
| 20 | 3720 | 7130 |
| 25 | 3870 | 5740 |
| 30 | 4900 | 7200 |

TABLE 4

Raw data, paper filter tests

| Flow Rate, | Pressure Drop, kPa | | Aerosol Concentration, $\mu g/m^3$ | |
|---|---|---|---|---|
| SLPM | Trial 3 | Trial 4 | Trial 3 | Trial 4 |
| 5 | 1.03 | 1.03 | 0.608 | 0.417 |
| 10 | 1.79 | 1.72 | 0.448 | 0.00133 |
| 15 | 2.76 | 2.76 | 0.483 | 0.00175 |
| 20 | 4.14 | 3.79 | 1.88 | 1.35 |
| 25 | 5.52 | 5.52 | 2.93 | 2.54 |
| 30 | 7.24 | 6.89 | 4.91 | 2.58 |
| 35 | 9.65 | 8.96 | 3.62 | 3.16 |
| 40 | 11.72 | 11.03 | 3.40 | 2.97 |
| 45 | 13.79 | 13.44 | 3.93 | 1.99 |
| 50 | — | — | — | 2.60 |

TABLE 5

Raw data, activated carbon filter tests

| Flow Rate, | Pressure Drop, kPa | | Aerosol Concentration, $\mu g/m^3$ | |
|---|---|---|---|---|
| SLPM | Trial 5 | Trial 6 | Trial 5 | Trial 6 |
| 5 | 1.17 | 1.38 | 0.49 | 0.74 |
| 10 | 2.07 | 2.21 | 3.04 | 0.98 |
| 15 | 2.76 | 3.03 | 7.32 | 2.46 |
| 20 | 4.00 | 4.14 | 4.53 | 1.71 |
| 25 | 4.83 | 5.52 | 4.64 | 0.99 |
| 30 | 6.21 | 6.89 | 2.22 | 0.62 |

TABLE 6

| Raw data, combined paper and activated carbon filter tests | | | | |
|---|---|---|---|---|
| Flow Rate, | Pressure Drop, kPa | | Aerosol Concentration, μg/m$^3$ | |
| SLPM | Trial 7 | Trial 8 | Trial 7 | Trial 8 |
| 5 | 2.62 | 2.07 | 5.74 | 1.45 |
| 10 | 4.14 | 3.45 | 0.651 | 0.0645 |
| 15 | 6.21 | 4.83 | 0.128 | 0.0614 |
| 20 | 7.86 | 6.55 | 0.111 | 0.0104 |
| 25 | 8.96 | 8.62 | 0.187 | 0.419 |
| 30 | — | 11.72 | 0.0845 | 0.0550 |
| 35 | — | 13.79 | — | 0.409 |

TABLE 7

| Net filtration efficiency with confidence intervals | | | |
|---|---|---|---|
| | Paper Only | Activated Carbon Only | Paper & Activated Carbon |
| Average Net Filter Efficiency* | 99.9964% | 99.9849% | 99.9985% |
| Confidence Intervals†† | (99.8798% – 99.9999%) | (99.8899% – 99.9979%) | (99.9937% – 99.9996%) |

*the average filter efficiency is $$\eta_{avg} = 1 - \exp\left(avg\left(\ln\left(\frac{c_{filtered}}{c_{unfiltered}}\right)\right)\right),$$

based on the geometric mean of the aerosol-penetration

†the confidence intervals are $$C.I. = 1 - \exp\left(avg\left(\ln\left(\frac{c_{filtered}}{c_{unfiltered}}\right)\right) \pm stdev\left(\ln\left(\frac{c_{filtered}}{c_{unfiltered}}\right)\right)\right)$$

The raw data from the filter efficiency testing measurements are given in Table 3 to Table 6. Filter efficiency could be determined from the ratio of the aerosol concentration at the exit of the cartridge with filters in place and not in place, according to Equation 8.

$$\eta = 1 - \frac{c_{filtered}}{c_{unfiltered}} \quad (8)$$

The aerosol generator 220 created NaCl aerosols with a mass median diameter of about 3.3 μm and geometric standard deviation of 1.3. Measured particle size distribution histograms are shown in FIG. 21, which compares the results with no filter to results with either the paper filter or activated carbon filter in place, in their prescribed location in the cartridge, but without the other type of filter present. There is a large downward shift in the particle size distribution, meaning the filters are more efficient for particles >0.7 μm. The paper filter had an overall efficiency of about 99.996%, while the activated carbon filter had an overall efficiency of 99.98%, as given in Table 7. When combined, the overall filtration efficiency when both filters were in place was about 99.999%. When implemented in the final radionuclide monitoring system, this means that nearly all of the aerosols should be effectively captured on the paper filter, and there should be limited by-pass of aerosols onto the activated carbon filter.

What has been described above has been intended to be illustrative of the invention and non-limiting and it will be understood by persons skilled in the art that other variants and modifications may be made without departing from the scope of the invention as defined in the claims appended hereto.

We claim:

1. A portable system for measuring airborne radionuclides from a target environment, the portable system being positionable in the target environment and comprising:

a) a primary gas flowpath extending between a system gas inlet configured to draw in a gas sample and a system gas outlet downstream from the system gas inlet;

b) a cartridge dock disposed in the primary gas flowpath and comprising a sample supply port in fluid communication with and downstream from the system gas inlet and an exhaust port in fluid communication with and upstream from the system gas outlet;

c) a first filter cartridge connectable to the cartridge dock, the first filter cartridge comprising:

i. a cartridge gas inlet sealingly connectable to the sample supply port;

ii. a cartridge gas outlet sealingly connectable to the exhaust port; and iii. a cartridge flowpath extending between the cartridge gas inlet and the cartridge gas outlet, whereby connecting the first filter cartridge to the cartridge dock provides the fluid communication between the sample supply port and the exhaust port and completes the primary gas flowpath;

iv. a first filter chamber disposed in the cartridge flowpath downstream from the cartridge gas inlet and housing a first filter; and v. a second filter chamber disposed in the cartridge flowpath between the first filter chamber and the cartridge gas outlet, and housing a second filter;

d) a gamma detector apparatus that is positionable adjacent the first filter cartridge when the first filter cartridge is connected to the cartridge dock, and is configured to detect radiation emitted from the first filter and to detect radiation emitted from the second filter, and to generate a sensor output signal based on the detected radiation; and e) a system controller configured to receive the sensor output signal and generate a corresponding user output.

2. The portable system of claim 1, wherein the first filter cartridge is removable from the cartridge dock, and wherein removing the first filter cartridge from the cartridge dock interrupts the primary gas flowpath.

3. The portable system of claim 1, wherein the first filter is of a first filter type and the second filter is of a second filter type that is different from the first filter type.

4. The portable system of claim 1, wherein the first filter comprises an aerosol filter configured to capture particulates in the gas sample, and wherein the second filter comprises an iodine filter.

5. The portable system of claim 1, wherein the first filter cartridge and the cartridge dock are configured such that the first filter cartridge is connectable to the cartridge dock by translating the first filter cartridge in an insertion direction, wherein when the first filter cartridge is connected to the cartridge dock, the cartridge gas inlet is registered with the sample supply port and a fluid seal is created between the first filter cartridge and the cartridge dock.

6. The portable system of claim 1, further comprising a cartridge handling apparatus that is controllable by the system controller and is configured to remove the first filter cartridge from the cartridge dock at an end of a first cartridge use period.

7. The portable system of claim 6, further comprising a second filter cartridge connectable to the cartridge dock, the second filter cartridge comprising:

i. a cartridge gas inlet sealingly connectable to the sample supply port;

ii. a cartridge gas outlet sealingly connectable to the exhaust port;

iii. a cartridge flowpath extending between the cartridge gas inlet and the cartridge gas outlet, whereby connecting the first filter cartridge to the cartridge dock provides the fluid communication between the sample supply port and the exhaust port and completes the primary gas flowpath;

iv. a first filter chamber disposed in the cartridge flowpath downstream from the cartridge gas inlet and housing a first filter; and v. a second filter chamber disposed in the cartridge flowpath between the first filter chamber and the cartridge gas outlet, and housing a second filter;

wherein the cartridge handling apparatus is controllable by the system controller to connect the second filter cartridge to the cartridge dock after the first filter cartridge is removed from the cartridge dock.

8. The portable system of claim 7, further comprising at least one fresh cartridge bank configured to store unused filter cartridges and containing the second filter cartridge, and wherein the cartridge handling apparatus is configured to retrieve the second filter cartridge and move it into registration with the cartridge dock after the first filter cartridge is removed from the cartridge dock.

9. The portable system of claim 8, further comprising at least one used cartridge bank that is configured to receive and store used filter cartridges, and wherein the cartridge handling apparatus is configured to remove the first filter cartridge from the cartridge dock and deposit the removed first filter cartridge in the at least one used cartridge bank.

10. The portable system of claim 1, wherein the gamma detector apparatus comprises a sensor portion that is movable between:

a) a measurement position in which the sensor portion is adjacent the first filter cartridge, wherein removal of the first filter cartridge from the cartridge dock is inhibited by the sensor portion; and b) an exchange position in which the sensor portion is spaced apart from the first filter cartridge, wherein the first filter cartridge can be removed from the cartridge dock.

11. The portable system of claim 10, wherein the gamma detector apparatus further comprises a detector actuator that is communicably linked to the system controller and supports the sensor portion, the detector actuator being configured to selectably move the sensor portion between the measurement position and the exchange position.

12. The portable system of claim 11, wherein the detector actuator comprises a linear actuator that is configured to linearly translate the sensor portion between the measurement position and the exchange position along a detector axis.

13. The portable system of claim 1, wherein the gamma detector apparatus includes at least a first detector that is aligned with the first filter, and a second detector that is spaced apart from the first detector and aligned with the second filter, and wherein the first detector is configured to generate a first detection signal that is based on gamma radiation in the first filter, and the second detector is configured to generate a second detection signal that is based on gamma radiation in the second filter.

14. The portable system of claim 13, wherein at least one of the first detector and the second detector comprises a gamma spectrometer that is at least partially laterally surrounded by a radiation shield to limit exposure to background radiation not emitted from the first filter cartridge.

15. The portable system of claim 1, wherein the sample supply port comprises a sample dock coupler comprising a curved supply sealing surface, and wherein the cartridge gas inlet comprises a complimentary curved inlet sealing surface configured to seal against the curved supply sealing surface.

16. The portable system of claim 15, wherein the curved supply sealing surface is convex and the complimentary curved inlet sealing surface is concave.

17. The portable system of claim 15, wherein when the first filter cartridge is connected to the cartridge dock, the curved supply sealing surface is pressed against the complementary curved inlet sealing surface to seal the first filter chamber, and wherein when the first filter cartridge is translated away from the cartridge dock, the curved supply sealing surface and the complementary curved inlet sealing surface are separated without releasing a fastener.

18. The portable system of claim 1, wherein the exhaust port comprises an exhaust dock coupler comprising a curved exhaust sealing surface, and wherein the cartridge gas outlet comprises a complimentary curved outlet sealing surface configured to seal against the curved exhaust sealing surface.

19. The portable system of claim 18, wherein the curved exhaust sealing surface is convex, and the complimentary curved outlet sealing surface is concave.

20. The portable system of claim 18, wherein when the first filter cartridge is connected to the cartridge dock, the curved exhaust sealing surface is pressed against the complimentary curved outlet sealing surface to seal the second filter chamber, and wherein when the first filter cartridge is translated away from the cartridge dock, the curved exhaust sealing surface and the complimentary curved outlet sealing surface are separated without releasing a fastener.

* * * * *